(12) United States Patent
Shakes et al.

(10) Patent No.: US 7,974,891 B2
(45) Date of Patent: Jul. 5, 2011

(54) METHOD AND APPARATUS FOR PROCESSING RECEPTACLES OF ITEMS IN A MATERIALS HANDLING FACILITY

(75) Inventors: Jonathan J. Shakes, Mercer Island, WA (US); Eric Young, Mercer Island, WA (US); Donald L. Kaufman, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 1435 days.

(21) Appl. No.: 11/389,872

(22) Filed: Mar. 27, 2006

(65) Prior Publication Data

US 2007/0150383 A1 Jun. 28, 2007

Related U.S. Application Data

(60) Provisional application No. 60/748,436, filed on Dec. 7, 2005.

(51) Int. Cl.
*G06Q 10/00* (2006.01)
*A01K 5/02* (2006.01)

(52) U.S. Cl. .......................................... 705/28; 705/29
(58) Field of Classification Search ........................ None
See application file for complete search history.

(56) References Cited

U.S. PATENT DOCUMENTS

| | | | | |
|---|---|---|---|---|
| 5,505,473 | A * | 4/1996 | Radcliffe | 280/79.2 |
| 6,289,260 | B1 * | 9/2001 | Bradley et al. | 700/216 |
| 7,110,855 | B2 | 9/2006 | Leishman | |
| 7,246,706 | B1 | 7/2007 | Shakes et al. | |
| 2002/0138172 | A1 | 9/2002 | Bahri et al. | |
| 2002/0169698 | A1 * | 11/2002 | Chien | 705/28 |
| 2003/0172013 | A1 | 9/2003 | Block et al. | |
| 2004/0153379 | A1 | 8/2004 | Joyce et al. | |
| 2004/0249497 | A1 | 12/2004 | Saigh et al. | |
| 2005/0047895 | A1 | 3/2005 | Lert, Jr. | |
| 2005/0077217 | A1 | 4/2005 | Hillerich et al. | |
| 2006/0020366 | A1 | 1/2006 | Bloom | |
| 2006/0206235 | A1 | 9/2006 | Shakes et al. | |

OTHER PUBLICATIONS

International Search Report from PCT/US 06-61433 mailed Feb. 20, 2008.

* cited by examiner

*Primary Examiner* — F. Ryan Zeender
*Assistant Examiner* — Paul Danneman
(74) *Attorney, Agent, or Firm* — Robert C. Kowert; Meyertons, Hood, Kivlin, Kowert & Goetzel, P.C.

(57) ABSTRACT

Methods and apparatuses for the processing of receptacles containing heterogeneous inventory items in materials handling facilities are generally described. Dirty picking may be described as a mechanism for the "batch" processing of a receptacle which includes multiple heterogeneous inventory items with different identification codes in a materials handling facility as if all of the items in the receptacle have been ordered, even though one or more of the items may have not been ordered. Through the implementation of a dirty pick mechanism, instead of processing individual items in a receptacle, the entire receptacle may be "dirty picked" and all of the items within the receptacle may be processed "downstream" at a processing station, during which needed items for processing may be selected, and "overage" items may be put aside to be disposed, e.g. by being restocked.

48 Claims, 11 Drawing Sheets

METHOD AND APPARATUS FOR PROCESSING RECEPTACLES OF ITEMS IN A MATERIALS HANDLING FACILITY

PRIORITY DATA

This application claims priority to U.S. Provisional Patent Application Ser. No. 60/748,436 filed Dec. 7, 2005, and which is herein incorporated by reference in its entirety.

BACKGROUND OF THE INVENTION

1. Field of the Invention

This invention relates to inventory selection systems, such as systems for selection or "picking" of inventory for order fulfillment.

2. Description of the Related Art

Retailers, wholesalers, rental services, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at materials handling facilities which may include, but are not limited to, one or more of: warehouses, distribution centers, cross-docking facilities, order fulfillment facilities, inventory rental facilities, packaging facilities, shipping facilities, factories, or other facilities or combinations of facilities for performing one or more functions of material (inventory) handling.

FIG. 1 illustrates a broad view of the operation of a conventional materials handling facility. Multiple customers 10 may submit orders 20 to the distributor, where each order 20 specifies one or more items from inventory 30 to be shipped to the customer that submitted the order. To fulfill the customer orders 20, the one or more items specified in each order may be retrieved or picked from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. Note that a picked, packed and shipped order does not necessarily include all of the items ordered by the customer; a shipped order may include only a subset of the ordered items available to ship at one time from one inventory-storing location. Also note that a materials handling facility typically also includes a receiving 80 operation for receiving new shipments 90 of stock from various vendors and placing the received stock into stock storage. The receiving 80 operation may also receive and process returned purchased or rented items 92 or orders from customers. At least some of these items are typically returned to inventory 30. Note that some items received in the receiving 80 operation may be delivered or "cross-docked" to other locations in the materials handling facility than inventory 30, for example to packing 60 or shipping 70. Further, note that the various operations of a materials handling facility may be located in one building or facility, or alternatively may be spread or subdivided across two or more buildings or facilities.

FIG. 2 illustrates an exemplary physical layout of a conventional materials handling facility, specifically an order fulfillment facility, or center. At any time, one or more agents 42 of the distributor may each be picking items from inventory 30 to fulfill portions or all of one or more orders. This may result in a stream and/or batches of picked items for multiple incomplete or complete orders, which may then be delivered to various stations (pick destinations 50), for example sorting or packing stations, in the materials handling facility for processing prior to shipping 70. A stream may be a continuous or nearly continuous flow of picked items arriving at a station, while groups of items arriving periodically or aperiodically at a station may be referred to as batches. Note that portions of an order may be received from the pickers 42, or from other stations, at a station at different times, so processing at a station may have to wait for one or more items for some orders to be delivered to the station from picking and/or from another station before completion of processing of the orders.

Agents, or pickers, 42 may receive instructions from a control system on a device such as an RF-connected wireless terminal or handheld scanner, to go to locations in inventory 30 to pick a list of items from those locations. A picker 42 typically scans a picked item to determine if the right item was picked. The picker 42 may then place the picked item in a receptacle for receiving picked items. The receptacle may be located on or integrated with a mobile cart of some type. The mobile cart may or may not be a powered vehicle. There may be more than one receptacle on a cart. Alternatively, the receptacle may be located on or integrated with a basket or chassis that is physically attached to or carried by the picker.

Conventionally, a picker 42 picks items from inventory 30 for only one pick destination 50 at a time. For example, a picker 42 may be instructed to pick items for one order at a time, or items for a batch of orders all going to one pick destination 50 (e.g., to a particular automated sorting station, manual sorting station, packing station, or other processing station), or a list of items from various orders all going to a particular destination, etc. Thus, a picker 42 picks items for one stream or process path for the items, delivers the picked items to their common pick destination 50, and leaves the processing and sorting of the picked items into their individual orders to the downstream station(s). The picker 42 then repeats the process for another list of items potentially for a different pick destination 50.

The stream or batches of incoming picked items are processed at a station, for example sorted into their respective orders at a sorting station. Once the processing of items for an order is completed at a station, the items may be delivered to another station for further processing, for example to a sorting station to be sorted into orders or to a packing station to be packaged for shipping 70.

Note that an order fulfillment center may also include one or more receiving 80 operations for receiving shipments 90 of stock from various vendors. The received stock may then be placed into stock storage. The receiving 80 operation may also receive and process returned, purchased, or rented items 92 from customers. At least some of these returned items 92 are typically returned to inventory 30. Also, Note that the various operations and stations of an order fulfillment center may be located in one building or facility, or alternatively may be spread or subdivided across two or more buildings or facilities.

Random Stow

In a materials handling facility, when a customer places an order, one or several inventory items specified in the order must be retrieved or picked from inventory and prepared for delivery to the customer. Conventionally, like items are stored together within inventory to facilitate inventory tracking and management. For example, items having a common Universal Product Code (UPC), Stock-Keeping Unit (SKU) code, or other designation (including proprietary designations) may be stored together within inventory. In an inventory environment that includes a large number of many different items, it may be highly inefficient for a single employee to locate and pick every item for a given order. For example, the different items specified by a given order may be stored at mutually remote locations within the inventory facility, which would require a single picking agent to traverse a long path through the facility.

In order to make better use of inventory stocking space, it may be desirable to stock different items together in a single storage location or stocking area. "Random-stow" is one technique of co-locating items in a materials handling facility in which any item may be stored in any slot in inventory 30 where physical space is sufficient. Given some inventory profiles, random-stow may be more efficient than more traditional inventory storage techniques, where like items are assigned to specific locations, and where a single slot, bin, container, receptacle, etc. typically contains items with at most one UPC, SKU code, or other designation.

Random-stow is a relatively broad term, in this context, meant to include any situation in which sets of heterogeneous products may be randomly or pseudo-randomly distributed in a single inventory location, and thus where conventionally one or more specific products may need to be removed from that location in such a way that the identity of the product being removed at a particular moment is known.

Random-stow methodology is not yet common in the logistics/storage industry because it requires computational resources that were too expensive 15+ years ago, and the industry is slow to adapt to new technology. Random-stow may become more common as logistics incorporates inexpensive information technology (IT) solutions, such as RFID technologies, and as the necessity to service "long tail" inventory profiles with many more SKUs than traditional storage techniques can handle grows. "Long-tail" refers to items in inventory that may have lower turnover rates, for example slow-moving items that are only occasionally ordered. Because of the low turnover rates, large quantities of long tail inventory are typically not kept in stock. For these types of items, it is inefficient to stow one product in one bin. Random-stow works well as a storage technique for these items.

One of the primary costs of random-stow is time spent at a bin for a picker to find the item requested. A conventional random-stow picking process requires an agent to walk to a receptacle (e.g., container, bin, tote, pallet, etc.) and then search it for the requested product(s) to be picked. Once the item is found in the bin, the agent can proceed to pick the item. Typically, this process is repeated for each pick from that bin. In some contexts, the walking portion of picking takes about half of the labor and the search portion takes the other half.

While increasing the efficient use of inventory space, co-location of different items, for example using a random-stow technique, may increase the difficulty, and thus the time, of identifying and picking a particular item. When picking items from inventory, the picking agent generally must examine any co-located items in order to determine the specific item to pick. This can be time-consuming in situations where numerous similar items are stored together. Additionally, several similarly titled or described items may be stored in a single inventory area, increasing the difficulty of identifying any particular item. For instance, if several CDs are entitled "Greatest Hits" and stored together, a picking agent may have to read the full title for each item in turn to identify the correct item. The extra time this requires may be significant when multiplied across the large number of orders fulfilled by a typical facility. Similarly, in a facility handling items for rent or sale, there may be a large number of similar-looking items, such as DVDs, stored together. A picking agent may have difficulty identifying particular DVDs from among multiple DVDs in a single inventory. Again, any extra time required to correctly identify a DVD becomes significant, since each DVD may be stored and picked many times, as it is rented and returned.

SUMMARY

Various embodiments of a method and apparatus for the processing of receptacles containing inventory items, or "dirty picking" of inventory, in materials handling facilities are described. Dirty picking may be described as a mechanism for the batch processing of a receptacle, which includes two or more inventory items, as if all of the items in the receptacle have been ordered, even though one or more of the items may have not been ordered. The items in the receptacle may be, but are not necessarily, heterogeneous inventory items with different SKUs, UPCs, or other identification codes. Through the implementation of a dirty picking mechanism, instead of processing individual items in a receptacle, the entire receptacle may be picked and all of the items within the receptacle may be processed "downstream" at an order processing station, during which needed items to fulfill orders may be selected, and "overage" items may be put aside to be disposed, e.g. by being restocked.

In one embodiment, dirty picking of receptacles from stock storage in an order fulfillment center may provide improved pick rates through the reduction or minimization of time spent at a receptacle, for example in a facility that implements "random-stow" or a similar inventory storage mechanism. Searching for specific titles or items at a receptacle is time consuming, and is instead replaced with picking the entire receptacle including multiple, and possibly heterogeneous, items and processing each item in the receptacle exactly once. In one embodiment, dirty picking may save a secondary receptacle-consolidation step for lingering or aging items in receptacles in inventory. The "overage", or unneeded, picks may be picked from the receptacle with the other items and later consolidated, returned to inventory or disposed through liquidation, vendor returns, etc.

In one embodiment, dirty picking may be applied to shipments of new inventory received at a receiving station of a materials handling facility. In some operational processes, there may be receptacles (e.g., containers) with heterogeneous products being received into a materials handling facility where a portion of the contents will be shipped immediately to customers, and a remainder of the contents may need to be stored in the materials handling facility rather than being shipped to customers immediately, even if at time of initially placing the items in the receptacle, all of the contents were intended for customer shipping. Using dirty picking, a receptacle or the contents of a receptacle may be "dirty picked" directly to an order processing station, where items for orders in the shipments may be separated from overage items that may later be placed in inventory. Thus, dirty picking of shipments received at the materials handling facility may reduce or eliminate the need to process individual items in receiving, stow the items in inventory, and then pick the items from inventory by facilitating the "cross-docking" of received items to an order processing station.

In at least some materials handling facilities, items may be returned by customers and processed upon arrival at a receiving area or station. At least some of the returned items may be items that have been subsequently ordered by other customers, and thus which, if possible, could be shipped out again immediately. In one embodiment, rather than restocking the returned items and re-picking the items from inventory, as is conventionally done in materials handling facilities, "expedited" receptacles including received, possibly heterogeneous, returned items may be moved or conveyed from receiving to a "downstream" order processing station, and processed as if all the returned items in the receptacles have been ordered, rather than restocking the items into inventory for later picking. Note that, in some materials handling facilities, the same physical location or "station" may be used to receive items as is used to ship items, so a "receiving station" and an "order processing station" may be at the same physical location or "station". In this case, the "expedited" receptacles may not have to be moved or conveyed from one station to another station. For simplicity, the order processing station may be considered a "downstream" station from the receiving station whether the two stations are at the same physical location or not. The downstream station may then separate the items that have been actually ordered from the overage items, and set aside the overage items to be restocked. In one embodiment, to perform this separation, each item in the receptacle may be processed as if it were needed for a customer order, and any overage items that are not needed for an order may be removed in accordance with an exception-handling process and set aside. In one embodiment, the contents of the receptacle may be visually inspected and any item(s) in the receptacle that are needed for orders may be manually removed based on the inspection, or alternatively any overage item(s) not needed for orders may be removed and set aside. In other embodiments, other mechanisms or methods may be used to separate ordered items from overage items in a receptacle. Dirty picking, in this case, may thus save the number of "touches" on returned items where some or a majority of the returned items may be immediately shipped back out by requiring that only overage items be restocked. Further, dirty picking of receptacles containing returned items may reduce the number of items that must be picked from inventory by satisfying orders, if possible, from "expedited" receptacles in preference to satisfying the orders from inventory.

Figure 1:
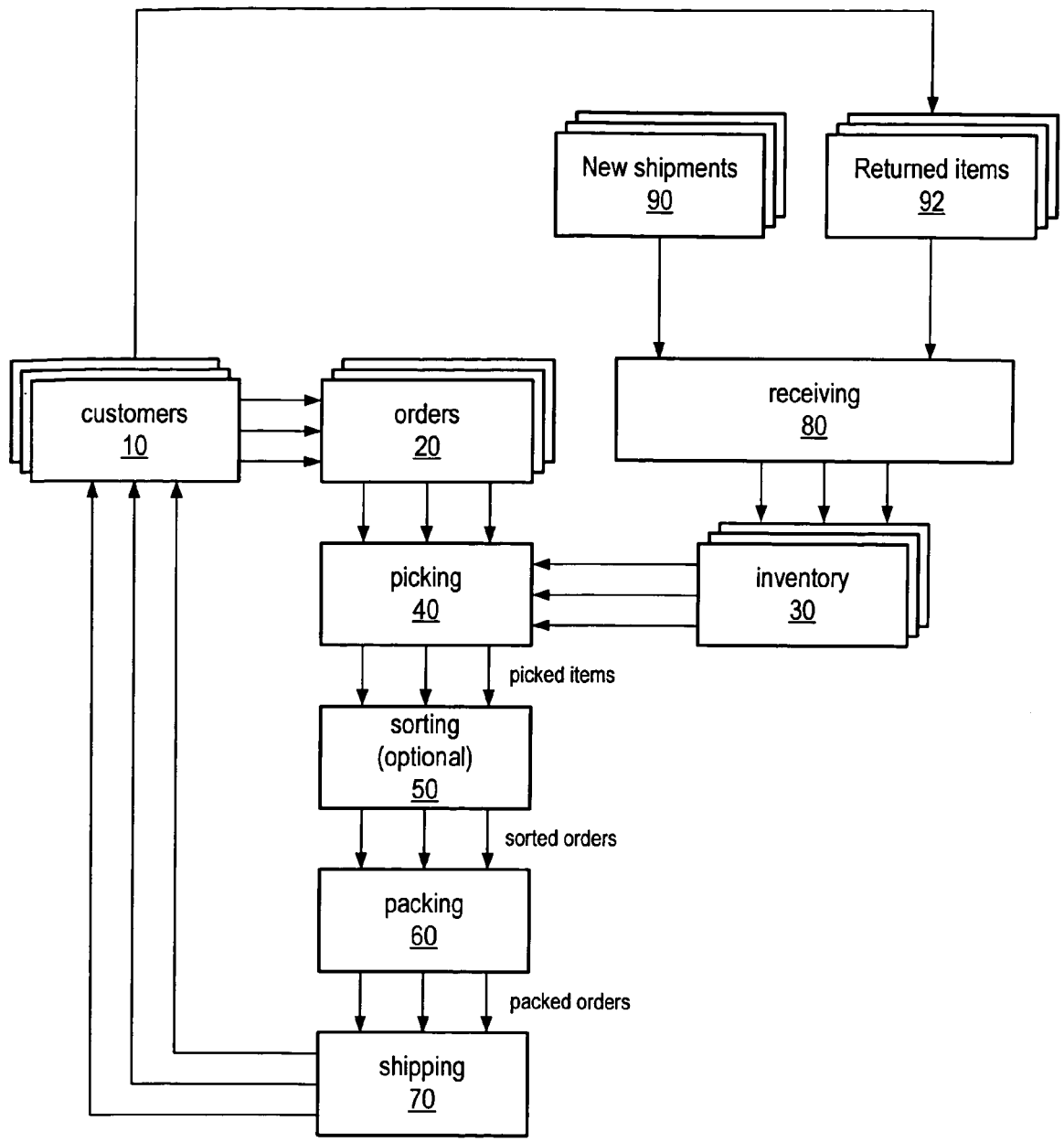
FIG. 1 illustrates a broad view of the operation of a conventional materials handling facility.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for the processing of receptacles containing multiple, possibly heterogeneous, inventory items, or "dirty picking" of inventory, in materials handling facilities are described. Dirty picking may be described as a mechanism for the batch processing of a receptacle, which includes two or more inventory items, as if all of the items in the receptacle have been ordered, even though one or more of the items may not have been ordered. The items in the receptacle may be, but are not necessarily, heterogeneous inventory items with different SKUs, UPCs, or other identification codes. Through the implementation of a dirty picking mechanism, instead of processing individual items in a receptacle, the entire receptacle may be picked and all of the items within the receptacle may be processed "downstream" at a station (e.g., at a packing or sorting station), during which needed items to fulfill orders may be selected, and "overage" items may be put aside to be disposed, e.g. by being restocked. A dirty picking mechanism in a materials handling facility may, for example, help to reduce the time on the search portion of the picking process in a materials handling facility that implements a "random-stow" or similar co-located inventory storage technique. A dirty picking mechanism may also be implemented, for example, to reduce the number of "touches" of received items, for example items returned from customers or collections of items in a received shipping container, in a materials handling facility.

While "dirty picking" and embodiments of a dirty picking mechanism are described herein primarily in the context of processing items for customer orders, note that "dirty picking" and the dirty picking mechanism as described herein may be applied to the picking and processing of items in receptacles in a materials handling facility for other reasons than fulfilling customer orders. For example, embodiments of the dirty picking mechanism may be applied to items that need to be transferred or moved to another facility, location or station; to items that are to be distributed to retail outlet(s); to items that are to be returned to a vendor or vendors; to items that are to be liquidated from inventory (liquidation may include one or more of, but is not limited to: return to a vendor, destruction, recycling, sale at a discount, donation, redistribution to another warehouse, etc.); to items or parts that are to be assembled at a manufacturing or assembly facility; etc. In general, embodiments of the dirty picking mechanism may be applied for picking items, parts, etc. for any type of processing of the items or parts located in receptacles in a materials handling facility. Further note that the term "order", when used herein, may be used to any request for item(s) to be processed at a "downstream" processing station in a materials handling facility including, but not limited to, customer orders.

Figure 2:
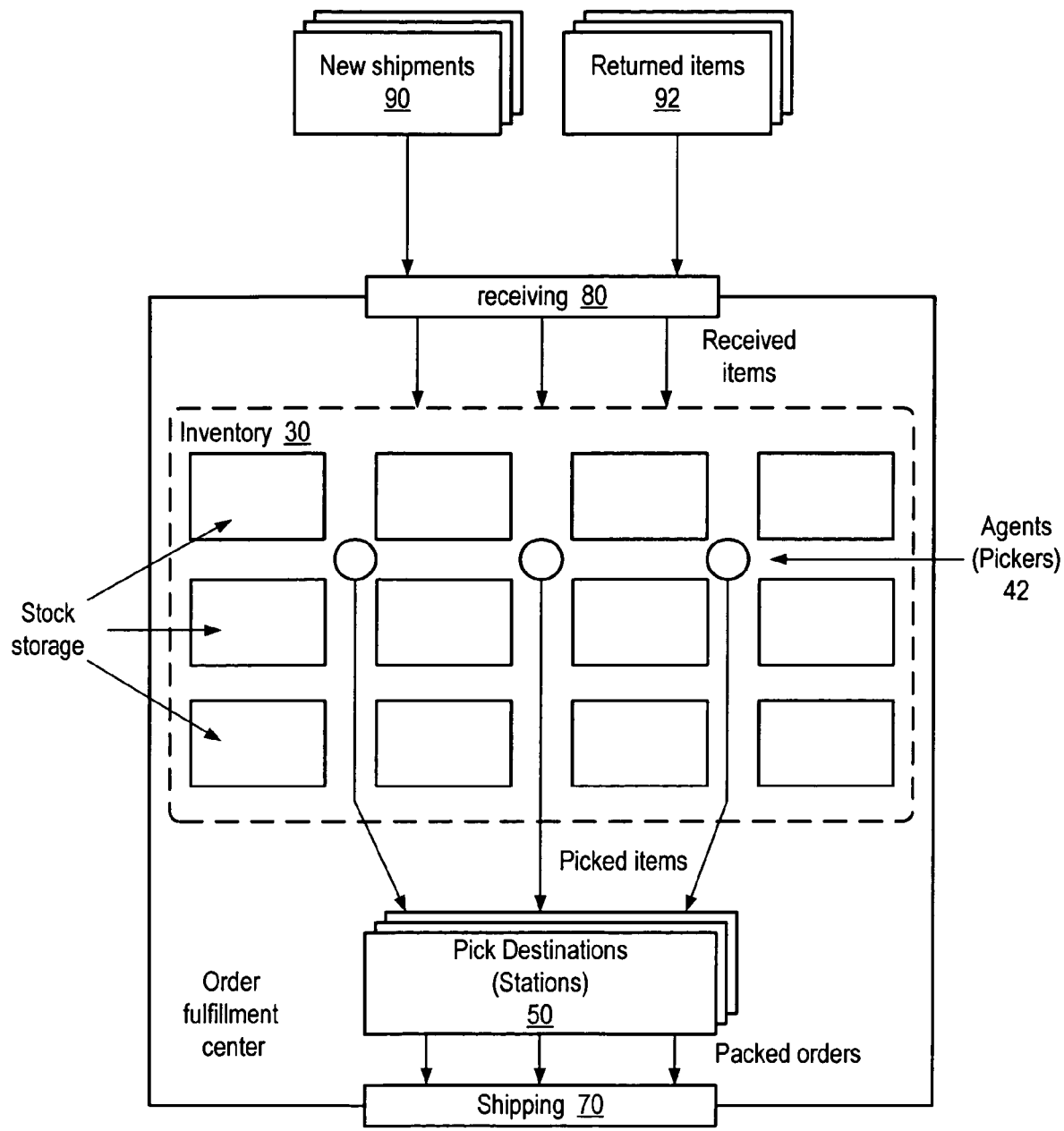
FIG. 2 illustrates an exemplary physical layout of a conventional order fulfillment facility.

Referring to FIG. 2, an embodiment of the dirty picking mechanism may free agents 42 (for example, pickers) from having to perform a search of a receptacle in inventory 30 for a specific item. The cost of a repeated search in a receptacle may be more expensive than the cost of "dirty picking" the entire receptacle and then performing downstream processing of each item in the receptacle, essentially assuming everything in the receptacle is supposed to be picked. Dirty picking offers an approach which allows the processing of an entire receptacle from inventory 30. The unneeded items ("overage") may then be returned back to inventory 30 or may be sent downstream for later consolidation or other processing.

Applications of a dirty picking mechanism in a materials handling facility may include one or more of, but are not limited to:

Improved pick rates through the reduction or minimization of time spent at a receptacle, for example in a facility that implements "random-stow" or a similar inventory storage mechanism. Searching for specific titles or items at a receptacle is time consuming, and is instead replaced with picking entire receptacles including multiple, and possibly heterogeneous, items and processing each item in the receptacle exactly once.

Receptacle Consolidation: Lingering items left unpicked in a receptacle generally identifies aging inventory that is tying up valuable space. Dirty picking may save a secondary receptacle-consolidation step for these lingering items, and instead the "overage", or unneeded, items may be picked from the receptacle with the other items and later consolidated with other items or disposed through liquidation, vendor returns, etc. There may be a seasonality effect that would help dictate when to send these overage items downstream for further processing (e.g., when capacity is available to handle these additional items) or when it is best to return the overage items to the receptacle.

Cross-docking: In some operational processes, there may be receptacles (e.g., containers) including multiple, and possibly heterogeneous, items being received into a materials handling facility where the majority of the contents will be shipped immediately to customers, and a minority of the contents may need to be stored in the materials handling facility rather than being shipped to customers immediately, even if all of the contents of a given receptacle were initially intended for immediate customer shipping. For example, during the inbound transit time period of the receptacle, some customers may have cancelled or changed their orders. In such situations, there needs to be an efficient way to process the items to be shipped and remove the minority of items needing storage. Dirty picking provides such a method.

Similar to the cross-docking case described above, items may be returned by customers to a materials handling facility and processed upon arrival at a receiving area or station. As an example, the materials handling facility may be a rental fulfillment facility that rents a typically limited number of items (e.g., DVDs) to customers for a rental period. At least some of the returned items, perhaps even a majority of the items, may be items that have been subsequently ordered by other customers, and thus which, if possible, could be shipped out again immediately. Rather than restocking and re-picking the items from inventory, as is conventionally done in materials handling facilities, receptacles including returned items may be moved from receiving to a "downstream" station, such as a packing or sorting station, and processed as if all the returned items in the receptacles have been ordered, rather than restocking the items into inventory. Note that, in some materials handling facilities, the same physical location or "station" may be used to receive items as is used to ship items, so a "receiving station" and an "order processing station" may be at the same physical location or "station". In this case, the "expedited" receptacles may not have to be moved or conveyed from one station to another station. For simplicity, the order processing station may be considered a "downstream" station from the receiving station whether the two stations are at the same physical location or not. The downstream station may then separate the items that have been actually ordered from the "overage" items, and set aside the "overage" items to be restocked. In one embodiment, to perform this separation, each item in the receptacle may be processed as if it were needed for a customer order, and any "overage" items that are not needed for an order may be removed in accordance with an exception-handling process and set aside. In one embodiment, the contents of the receptacle may be visually inspected and any item(s) in the receptacle that are needed for orders may be manually removed based on the inspection, or alternatively any "overage" item(s) not needed for orders may be removed and set aside. In other embodiments, other mechanisms or methods may be used to separate ordered items from "overage" items in a receptacle. Dirty picking, in this case, may thus save the number of "touches" on returned items where some or a majority of the returned items may be immediately shipped back out by requiring that only "overage" items be restocked. Further, dirty picking of receptacles of returned items may reduce the number of items that must be picked from inventory by satisfying orders, if possible, from the "expedited" return receptacles in preference to satisfying the orders from inventory.

In one embodiment, a dirty picking mechanism may be cost-effective whenever the cost of picking M Items separately from a receptacle is greater than the cost of processing the entire receptacle plus the (cost of error*number of unneeded items in the receptacle). Another way to put this is, approximately, whenever:

$$((S*N/2)+P)*M>N*P+(E*(N-M))$$

where:
 S=time to look at an item and see if it matches a specific SKU needing to be picked from the receptacle
 N=number of items in the receptacle
 M=number of items needing to be picked from the receptacle
 P=time to pick an arbitrary item without counting search time
 E=time to process an un-needed item As previously mentioned, one of the primary costs of random stow is time spent at a receptacle for a picker to find the item requested. Dirty picking offers a solution proportional to the number of items in the receptacle, as opposed to requiring multiple searches across all items in a receptacle. The cost savings in picking labor may be significant, as it is possible to avoid a stow in some cases and in others it is possible to reduce time spent at a receptacle or location in inventory.

Dirty picking works on the assumption that a significant percentage of items in a receptacle may be processed for orders on the same day (or in the same order period or cycle). Rather than picking items from a receptacle one at a time, the entire receptacle is picked as if every item in the receptacle is needed for orders. When the "dirty picked" receptacle is processed at a downstream order processing station (e.g., a packing station or sorting station), any items left over ("overage") may be rebinned (put back) into stock storage, as opposed to searching through the bin for items one at a time "upstream" (e.g., during a conventional picking process). The cost of "dirty picking" an entire receptacle and processing the items downstream, separating out and rebinning overage items, may typically be less than picking through the receptacle to find individual items.

"Dirty picking" is different than conventional picking. Dirty picking may reduce or even eliminate the need to pick individual items from inventory in a materials handling facility in the conventional manner, where individual items are searched for and picked from receptacles containing a plurality of items. Instead, entire receptacles, which may contain two or more heterogeneous items, are picked. In addition, when items are received into the materials handling facility, dirty picking may reduce or eliminate the need to stock received items into inventory and re-pick the individual items from inventory. Instead, receptacles including a plurality of received items may be conveyed directly from receiving to an order processing station as if all of the items are expected to be shipped that day. Order processing station(s) may have "error proofing" mechanisms that detect and reject items that are not going out on orders currently in the system. Those items are set aside to be restocked or rebinned into stock storage.

Dirty picking may improve the performance of a materials handling facility for the handling of at least some types of orders from the perspective of customers. For example, in some materials handling facility implementations, for example in a materials handling facility that handles ordering items for rental and the return of rented items, a customer may have a queue or list of items that they want to receive at any given time. Dirty picking of returned items and processing the items as a "batch" may provide for the automated prioritization of items on customers' lists that may conflict, which would be difficult to do using conventional stow-and-pick. For example, if an item is received that is high on one customer's list and lower on another customer's list, a conventional stow-and-pick mechanism would make it difficult to insure that the item is sent to the first customer. Using dirty picking, all returned items for a day, for example, may be collected and processed together as a batch as if all of the items had been ordered. A control system, examining all of the items received and being processed at one time rather than serially, may be configured to allocate the items preferentially to customers based on the status of the customers' orders. Further, there may be a quota on how many items a customer can receive at one time. If items for the customers were processed one-by-one using conventional stow-and-pick, a lower-priority item on a customer's list may be filled before a higher-priority item, preventing the customer from receiving the higher-priority item. By processing "dirty picked" items as a batch, the control system may insure that the customer gets the higher-priority item first.

If there is a limit on how many items a customer may have at one time (e.g., in a rental system), dirty picking may be used to justify sending at least some "trusted" customers additional items over the limit. For example, if there is limit of three items per customer, the materials handling facility may send a fourth item selected through "dirty picking" to a customer that is "trusted" at the time of "dirty-picking" a receptacle with that item. The risk of sending a fourth item to the customer may be less than the cost benefit of saving "touches" through the dirty picking process.

Dirty picking may also help in consolidating items in inventory into fewer bins, and in culling out sparsely stored or long tail items from receptacles in inventory. "Overage" or rejects from a "dirty picked" receptacle may go downstream from the station that separates items for orders from the overage through a put-back process, a vendor return process, etc. Items put-back into inventory may be consolidated into other receptacles. Some items in a receptacle may be long tail items (e.g., items that are slow-movers, or obsolete, have exceeded a shelf life, or may otherwise need to be removed from inventory). "Dirty picking" of receptacles from inventory, in which entire receptacles are picked and all of the contents of the receptacles are processed as a batch, may be used to clear these items from a receptacle in inventory so that the receptacle may be used for storing additional products. The long tail items may be separated and set aside for consolidation or disposal, for example, through liquidation or returning to a vendor.

Embodiments of a dirty picking mechanism may enable the performance of multiple inventory handling processes at once in a single motion or process. In dirty picking from inventory, the fact that overage items are "touched" or processed does not result in a loss of productivity. These items may be long tail items or the picked receptacles may need consolidating, so the overage items would have been "touched" in any case. Further, the reduced time in searching the receptacles in inventory outweighs any extra handling that may result.

Another exemplary application for embodiments of a dirty picking mechanism may be in a forward order fulfillment center that receives items from a central order fulfillment center. At least a portion of the received inventory from the central order fulfillment center may be designated as "very likely" to go out to customers that day (or during a predefined period). This portion of the received inventory may be "dirty picked" and sent as a batch to an order processing station, such as a packing station. Note that items may be sent to the forward order fulfillment center to fulfill specific customer orders. In the meanwhile, the order situation may change; a customer may cancel or change an order, or an order may be filled from some other forward order fulfillment center. Thus, the received items may not all be used to satisfy orders, and are thus "dirty picked" to the order processing station, where items to be sent to satisfy orders are separated from "overage" items that are not specified on the orders. The overage items may then be stocked into inventory.

In addition, in a regular random stow bin in a central order fulfillment center, conventionally, agents may have to go through and pick items from receptacles in inventory to send to a forward order fulfillment center. The cost of "dirty picking" an entire receptacle and sending all of the contents of the receptacle to the forward order fulfillment center, where the items of the dirty picked receptacle received from the central order fulfillment center may be processed at an order processing station to cull out the "overage", may be lower than selectively picking some of the items out of the receptacle. The overage items may be useful to have at the forward order fulfillment center in the future to satisfy other orders.

In one embodiment, in a materials handling facility that implements a "random stow" technique for inventory, heterogeneous inventory items that are known to be "fast movers" may be preferentially stored together in receptacles in inventory so that "dirty picked" receptacles are more likely to contain a higher percentage of items that will be shipped that day.

In many materials handling facilities, there may be multiple items in an order. In one embodiment, when processing batches of items from dirty picked receptacles, an agent processing the items at an order processing station, for example at a packing station, may be informed by the control system if an item is for a single-item order or a multi-item order. If the item is for a single-item order, the agent may process (e.g., package and label) the item. If the item is for a multi-item order, the agent may send the item to another station for sorting into the order and packing of the multi-item order.

In one embodiment, "dirty picked" receptacles that may include items for multi-item orders may be separated into smaller receptacles, with a limited number of items in each expedited receptacle. A conventional pick may then be performed on the receptacles to remove at least most of the items for multi-item orders from the receptacles. After the conventional pick, long tail items, overage items, and/or items for single-item orders may remain in the receptacles, and at most a limited number of items for multi-item orders. The conventionally picked items for multi-item orders may then be conveyed to a sorting station. This process of picking at least some items for multi-item orders from the receptacles may help to prevent the sorting station from being overwhelmed by the number of orders it would need to sort from the receptacles.

Another application for embodiments of a dirty picking mechanism is for a vendor to send "expedited receptacles," each including a plurality of possibly heterogeneous items, to the order fulfillment center. The expedited receptacles from the vendor may be processed in receiving (e.g., by scanning a bar code on the receptacles, and/or by scanning in the items in the receptacles) and then conveyed directly to an order processing station, where the contents may be processed to cull overage items from items to be shipped. The overage items may then be stocked into inventory. Note that the control system may "expedite" the items in the expedited receptacles by preferentially filling orders from the expedited receptacles, if possible, rather than having an agent pick the items from inventory.

"Dirty picking" of incoming shipments may be applied to shipments received from any third-party that is sending in items to the materials handling facility. "Dirty picking" may be leveraged to save receiving from having to receive the items in the shipments individually, and stock the items into inventory. Instead, the items in a shipment or shipments may be "dirty picked" and conveyed to an order processing station where the items may be processed, with many or most of the items being shipped to fulfill current orders, and any other items being culled out as overage to be placed into inventory. This saves from having to process and stow entire shipments into inventory prior to picking, thereby saving "touches" of the items.

Note that, in some materials handling facilities, a receiving station and an order processing station may be at the same physical location, so conveyance of the receptacles from one station to another station may not be necessary.

Overage items that are not associated with an order and thus, not shipped, may be placed into put-back receptacles. The put-back receptacles may be conveyed to stock storage where the items may be "put" into inventory. Alternatively, a put-back receptacle may be cycled back through the "dirty picking" process, where at least some of the items in the receptacle may be used to fulfill orders that have subsequently been entered into the materials handling facility control system.

Another application of the dirty picking mechanism may be to dirty pick from inventory 30 (or process into receiving 80) an entire receptacle (case, box, container, package, etc.) containing two or more units of a single item (rather than a receptacle that contains one or more units of two or more different items). The entire receptacle may then be sent to a downstream processing station 50 for processing, even if not all of the units in that receptacle currently need to be processed at the station 50. Thus, the picker, or an agent in receiving 80, does not have to open the receptacle, dispose of packing material, move the units into a tote or other receptacle, or perform quality checks. In one embodiment, all receptacles may thus be opened at a downstream station 50, which may include centralized and consolidated automated case-opening systems and takeaway conveyors for packing materials, rather than having those tasks and systems distributed throughout the materials handling facility, e.g. in inventory 30 areas and in receiving 80.

Embodiments of a dirty picking mechanism may allow the "late binding" of units of items to specific customer orders (or to other requests for items to be processed). "Late binding" refers to the association of one or more units of an item to a specific order or request during or after the picking process. Conventional order fulfillment systems generally require binding to occur prior to pick. Using a dirty picking mechanism, one or more of the "overage" items in a dirty picked receptacle may be bound to orders between the time the receptacle is initially picked from inventory 30 (or "cross-docked" from receiving 80) and the time the items in the dirty picked receptacle are processed at a downstream processing station 50. Allowing the "late binding" of items in dirty picked receptacles may be particularly advantageous for "fast-moving" merchandise, as the number of late-bound units of the items may be significant. By late binding items in dirty picked receptacles, the pickers may not have to go back to a storage location in inventory 30 to pick items as often. Further, late binding may reduce the cycle time from the receipt of a customer order to the time the item is shipped, or the cycle time for other processes that require the conveyance of items to a station 50. Further, late binding may allow more time for the customer (or some other system) to cancel an order. Late cancellations of orders for items may be dealt with directly by the dirty picking process as described herein with no additional exception-handling process required (the cancelled orders simply become "overage" again, and are handled as any other overage item, without requiring additional exception handling mechanisms).

Figure 3:
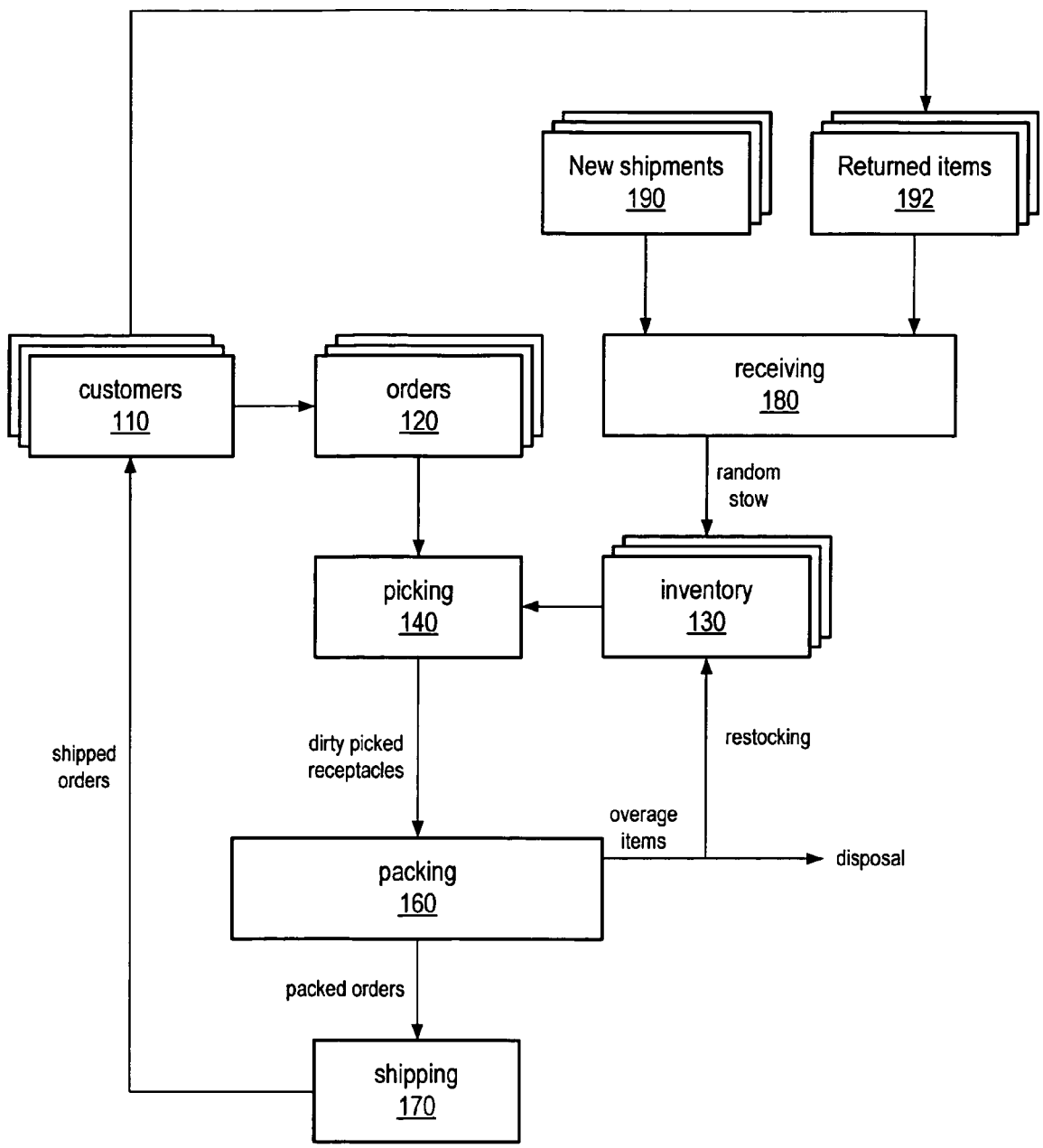
FIG. 3 illustrates a dirty picking mechanism whereby receptacles containing multiple items are picked from inventory in a materials handling facility, according to one embodiment.

FIG. 3 illustrates a dirty picking system whereby receptacles containing multiple items are picked from inventory in a materials handling facility, according to one embodiment. For example, the materials handling facility may implement a "random-stow" or similar inventory storage mechanism where heterogeneous items may be stored together in inventory 130. Shipments 190, for example shipments containing newly arriving merchandise from a vendor or from another materials handling facility, and/or returns 192 of heterogeneous items, for example items returned from customers, may be received in receiving 180 and stored in inventory 130 in accordance with the "random stow" or similar mechanism whereby heterogeneous items may be stored together in receptacles. Customers 110 may submit orders 120 for items. The orders 120 may be input into a control system of the materials handling facility. Conventionally, during a picking 140 process, the control system may direct an agent handling a particular order to pick particular items from particular locations to fill the order. Using the dirty picking mechanism, during the pick 140 process, the control system may direct the agent to a receptacle or location in inventory 130, where, instead of searching for and picking individual items from the receptacle, the agents may "pick" the entire receptacle containing multiple, and possibly heterogeneous, items.

"Picking" a receptacle may involve removing a receptacle containing the multiple, possibly heterogeneous, items from an inventory location (e.g., from a shelf or rack) and placing the receptacle on a cart or other transportation device. Alternatively, the items may be removed from the inventory location and placed into a receptacle for receiving picked items. In some embodiments, the receptacle may be located on or integrated with a mobile cart of some type. There may be more than one receptacle on a cart.

Receptacles, as used herein, may include any fixed or mobile mechanism, object, fixture, shelf, container, bin, tote, basket, box, slot, compartment, etc. configured to hold items in a materials handling facility. Receptacles may include one or more of, but are not limited to, fixed or mobile bins, totes, baskets, boxes; compartments within a partitioned bin, tote, basket, box or similar container; bins, totes, slots, boxes, containers, compartments, or some other form of receptacle on a conveyor belt; shelves or sections of partitioned shelves, either fixed or on a mobile shelving unit; wheeled containers; hoppers; induct lanes on an automated sorting mechanism; or in general any device, object, fixture, container, slot, compartment, etc. configured to receive picked items in a materials handling facility. In some embodiments, one or more receptacles, such as totes or bins, may be mobile and thus configured to be placed on or removed from a push cart, conveyor belt, roller, or other device for conveying the receptacles in the materials handling facility. In some embodiments, receptacles may include compartments, subdivisions or partitions in, for example, a bin, tote, or shelf. In some embodiments, a bin, tote, basket, or similar container, which may be subdivided into two or more compartments each of which is a receptacle, may include integrated wheels, rollers or some other mechanism for conveying the container in the materials handling facility. In other embodiments, the receptacles may be fixed, for example fixed to the floor or on a shelving unit.

The agent may then deliver the "dirty picked" receptacles (s) to a downstream station, for example a packing 160 station. At the packing station, each of the items in the receptacle (s) may be scanned or otherwise entered into the control system. Note that, in one embodiment, at least some items may include RFID-detectable "tags" that may be sensed by an RFID "reader" that may be used to enter the item into the control system at the packing station. In one embodiment, at least some items may be manually entered into the control system. In general, any of various methods or mechanism for entering items into a control system, or combinations of two or more thereof, may be used. The control system may then indicate to an agent at the station as to which scanned items are intended to fill orders 120, and which items are "overage" items. The items for orders 120 may then be processed (e.g., consolidated, packaged and labeled for shipping), and the packaged orders may then be delivered to shipping 170 to be shipped to customers 110. The "overage" items may be set aside, for example by placing the items in a "put-back" or restocking receptacle, the contents of which may later be returned to inventory 130.

Dirty picking may save a secondary receptacle-consolidation step for long tail inventory items. Instead of being placed in a "put-back" receptacle, at least some of the overage items may be picked from the receptacle with the other items and later consolidated or disposed through liquidation, vendor returns, etc.

Figure 4:
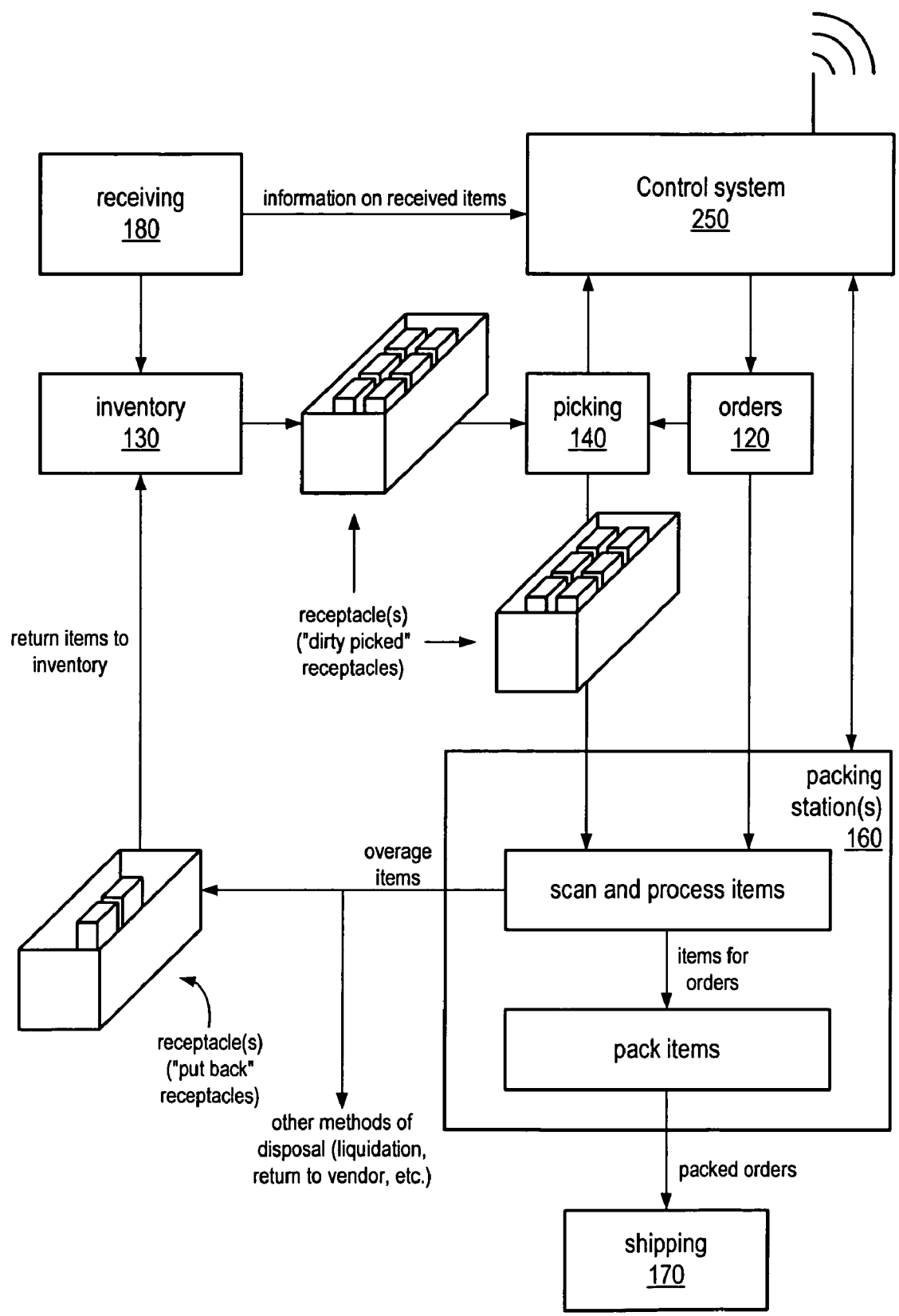
FIG. 4 illustrates in further detail a dirty picking mechanism whereby receptacles containing multiple items are picked from inventory in a materials handling facility, according to one embodiment.

FIG. 4 illustrates in further detail a dirty picking mechanism whereby receptacles containing multiple items are picked from inventory in a materials handling facility, according to one embodiment. For example, the materials handling facility may implement a "random-stow" or similar inventory storage mechanism where heterogeneous items may be stored together in inventory 130. Shipments and/or returns of heterogeneous items may be received in receiving 180 and stored in inventory 130 in accordance with a "random stow" or similar mechanism whereby heterogeneous items may be stored together in receptacles. Information on the received items may be entered into a control system 250 of the materials handling facility. Customers may submit orders 120 for items. The orders 120 may be input into the control system 250 of the materials handling facility. During the picking 140 process, the control system 250 may direct the agent to a receptacle or location in inventory 130, where, at least in some cases, instead of searching for and picking individual items from the receptacle, the agents may "pick" the entire receptacle containing a plurality of items. The receptacle may, but does not necessarily, include heterogeneous items. In one embodiment, a barcode or other such marking on the receptacle may be scanned or otherwise entered into the control system 250 by the picking agent. Note that the control system 250 may implement software program(s) that enable the "dirty picking" process in the materials handling facility.

In some implementations, conventional picking of individual items from receptacles in inventory 130 may be performed in conjunction with "dirty picking" of entire receptacles. In one embodiment, the control system 250 may be configured to generate picking instructions for the agents that specify whether an entire receptacle is to be "dirty picked" from a location in inventory 130 or whether an individual item is to be picked from the receptacle.

The agent may then deliver the "dirty picked" receptacle(s) to a downstream station, for example a packing 160 station. At the packing station, each of the items in the receptacle(s) may be scanned or otherwise entered into the control system 250. The control system may then indicate to an agent at the station which scanned items are intended to fill orders 120, and which items are "overage" items (items in the receptacles which are not included in any orders 120 being processed). The items for orders 120 may then be processed (e.g., consolidated, packaged and labeled for shipping), and the packaged orders may then be delivered to shipping 170 to be shipped to customers 110. The "overage" items may be set aside, for example by placing the items in a "put-back" or restocking receptacle, the contents of which may later be returned to inventory 130. Note that items, and locations of items, returned to inventory may be scanned or otherwise entered into control system 250 so that the control system 250 may track the disposition, location, quantities, and other information of items within the materials handling facility.

In one embodiment, the control system 250 may preferentially match items in a "dirty picked" receptacle to orders 120 in advance of the items being processed at a station 160. The control system 250 may then direct an agent in picking items from inventory 130 that cannot be fulfilled from the items in the "dirty picked" receptacle. In one embodiment, the control system 250 may be configured to instruct an agent to "dirty pick" an entire receptacle rather than to pick one or more individual items from the receptacle if the control system 250 determines that the "dirty picking" and processing of the entire receptacle may be more efficient than picking individual items from the receptacle.

In one embodiment, rather than matching items in a "dirty picked" receptacle to orders 120 in advance of the items being processed at a station 160, the control system 250 may match the items to orders as the items are processed at the station 160. This may permit, for example, an agent to "dirty pick" an entire receptacle from inventory 130 and deliver the receptacle to a station 160 without being directed to by the control system 250. This may also enable the control system 250 to process and fulfill at least some new orders (e.g., orders received between the "dirty picking" of the receptacle and the arrival of the "dirty picked" receptacle at the station 160) from items in a "dirty picked" receptacle.

As mentioned, some "overage" items may be placed in a "put-back" receptacle to be restocked. Dirty picking may save a secondary receptacle-consolidation step for overage items. Instead of being placed in a "put-back" receptacle, at least some of the unneeded or "overage" picked items may be picked from the receptacle with the other items and later consolidated or disposed through liquidation, vendor returns, etc. Note that the control system 250 may be configured to direct the agents handling the overage items as to which items are to be returned to inventory and which items are to be otherwise disposed.

Another possible application for the dirty picking mechanism as described herein is to provide an opportunity to relocate long tail items from dirty-picked receptacles to a more appropriate region of stock, storage, for example relocating the items from a fast-moving inventory region to a slow-moving inventory region. Movement of long tail items from a fast-moving inventory region to a slow-moving inventory region may help to increase picking efficiency.

Figure 5:
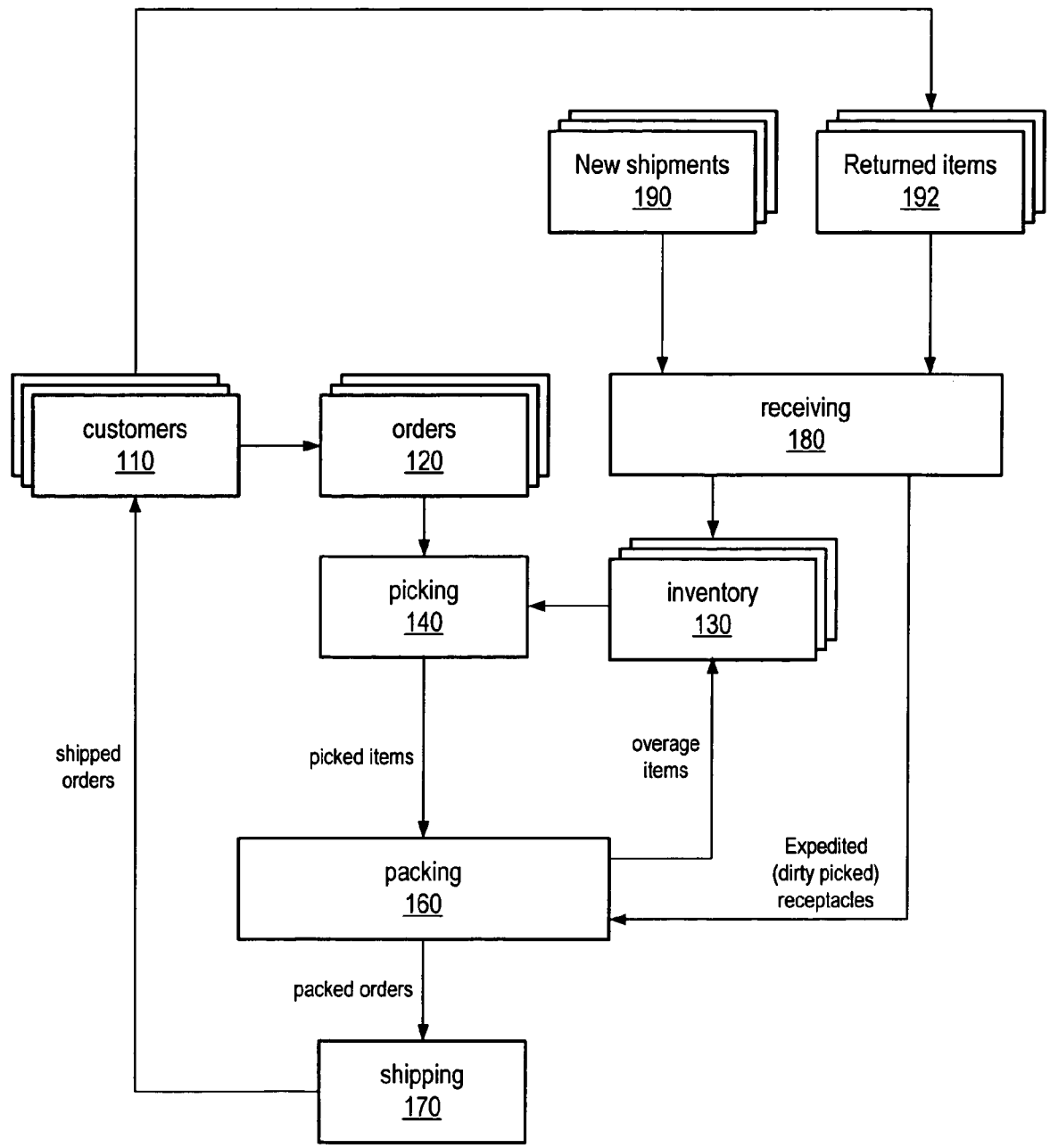
FIG. 5 illustrates a dirty picking mechanism whereby receptacles in receiving containing received items are picked and processed at a downstream packing station in a materials handling facility, according to one embodiment.

FIG. 5 illustrates a dirty picking mechanism whereby at a receiving operation receptacles containing multiple, and possibly heterogeneous, items may be "dirty picked" and processed at a downstream packing station in a materials handling facility, according to one embodiment. The received receptacles that are "dirty picked" may, for example, be containers including multiple, and possibly heterogeneous, items received in new shipments 190. For example, received receptacles that are dirty picked may be, but are not limited to, shipments containing newly arriving merchandise from a vendor or from another materials handling facility, receptacles that are to be "cross-docked" to packing 160, receptacles containing multiple, and possibly heterogeneous, returned items, etc. "Dirty-picking" the received receptacles may allow receptacle-level (as opposed to the more labor-intensive item-level) processing at the receiving station, and may require no item-level "touch" of the items in the receptacles until the "dirty-picked" receptacles are processed during order processing.

In one embodiment, returned items 192, for example items returned from customers, received in receiving 180 operation may be included in a "dirty picked" receptacle. In one embodiment, each day, some or all received items that are returns from customers may be placed into "expedited" receptacle(s) (bins, containers, totes, boxes, etc.) for later picking that same day. Note that the returned items 192 may be processed in receiving 180 operation. This processing may include, but is not limited to, removing the returned items from shipping packages and scanning or otherwise entering the returned items 192 into a materials handling facility control system. The processing may also include inspecting the returned items 192 to verify that the items are in a condition to be reshipped to customers. Any damaged items, items with damaged or removed packaging, items missing content, etc. may be set aside for other processing.

Once all of the returns for the day have been processed, or after some portion of returns have been processed, the expedited receptacles may be moved to a downstream station in the materials handling facility (e.g., a packing 160 station), where each item in the expedited receptacle may be scanned or otherwise entered into the control system, as if there is an order 120 for every item that has been returned. Note that, in some materials handling facilities, the same physical location or "station" may be used to receive items as is used to pack and/or ship items. In this case, the expedited receptacles may not have to be moved or conveyed from one station to another station. When there is not an order 120 in the system that includes a particular item in the expedited receptacle, the item is treated as "overage" and set aside to be returned to inventory 130 or otherwise disposed. Items for which there is an order may be matched to an order 120, further processed (e.g., packaging and labeling), and delivered to shipping 170 to be shipped to customers 110.

In one embodiment, the materials handling facility control system may be configured to match the returned items 192 to orders 120 in the control system. This "expedites" the returned items by preferentially filling orders from the returned items 192 instead of from inventory 130, if possible. In one embodiment, for example, after all of the returned items 192 for a day have been processed in receiving 180, the control system may run a process that matches as many of the returned items 192 that were received that day to orders 120 being processed for the day. Agents may then be directed by the control system to pick from inventory 130 any items on the orders 120 that cannot be filled from the returned items 192. The picked items may then be delivered to a downstream station, for example a packing 160 station, for processing along with the "expedited" returned items 192.

Note that, in one embodiment, picking of at least some of the items from inventory 130 in this case may be performed in accordance with a "dirty picking" mechanism as described for FIGS. 3 and 4.

The above describes the "dirty picking" process for returned items 192 as occurring once a day. For example, all returns may be received in the morning, processing of the "expedited" returns for the day to match the returned items 192 to orders 120 may be performed at midday, and then any remaining items on the orders 120 may be picked from inventory 130. The returned items 120 and picked items may be delivered to a downstream station, for example to a packing 160 station, for processing as described above.

However, note that this "dirty picking" process may be performed periodically or aperiodically, and may be performed as described once a day, more than once a day or less than once per day, for example every other day, or once a week. For example, returned items 192 may be collected in receiving 180 during the week, and processed as "expedited" receptacles including returned items for orders on Friday. As another example, returned items 192 may be collected in receiving 180 until one or more expedited receptacles are full, and then the full, expedited receptacle(s) may be processed. As yet another example, there may be more than one cycle of the "dirty picking" process performed periodically or aperiodically in a day.

In some materials handling facilities implementing the above dirty picking mechanism for returned items 192, at least some, and possibly the majority, of returned items 192 do not need to be stowed to inventory 130 and are instead immediately sent back out to a customer. Thus, the dirty picking may result in cost savings when handling returned items 192 by eliminating the need to stow each returned item 192 in inventory 130 and to then re-pick the item to fill new customer orders 120.

In some operational processes, there may be receptacles (e.g., containers) including multiple, and possibly heterogeneous, items being processed into receiving 180 of a materials handling facility where at least some, and possibly the majority, of the contents may be shipped immediately to customers 110, and a minority of the contents may need to be stored in the materials handling facility rather than being shipped to customers 110 immediately. This may result even if at time of initially placing the items in the receptacle for delivery to the materials handing facility, all of the contents were intended for immediate customer shipping. For example, during the inbound transit time period, some customers 110 may have cancelled or changed their orders 120. In such situations, there needs to be an efficient way to process and ship the items for which there are outstanding orders and to process, remove and store the items for which there are no outstanding orders.

Thus, in one embodiment, the dirty picking mechanism may be applied to at least some new shipments 190 of items. In this embodiment, a received receptacle (e.g., container) including multiple, and possibly but not necessarily heterogeneous, items may be received and initially processed in receiving 180. In processing, the contents of the receptacle are entered into the materials handling facility control system. The receptacle may then be "cross-docked" to a downstream station in the materials handling facility (e.g., a packing 160 station), where each item in the receptacle may be scanned or otherwise entered into the control system, as if there is an order 120 for every item in the receptacle. When there is not an order 120 in the system that includes a particular item in the receptacle, the item is treated as "overage" and set aside to be returned to inventory 130 or otherwise disposed. Items for which there is an order may be matched to the order 120, further processed (e.g., packaging and labeling), and delivered to shipping 170 to be shipped to customers 110. Note that agents may be directed by the control system to pick from inventory 130 any items on the orders 120 that cannot be filled from the "cross-docked" receptacle. The picked items may then be delivered to a downstream station, for example a packing 160 station, for processing along with the items from the receptacle. Note that, in one embodiment, picking of at least some of the items from inventory 130 in this case may be performed in accordance with a "dirty picking" mechanism as described for FIGS. 3 and 4. Further, in one embodiment, the "cross-docking" dirty picking process for new shipments 190 may be used in conjunction with the "dirty picking" of returned items 192 as described above.

Figure 6:
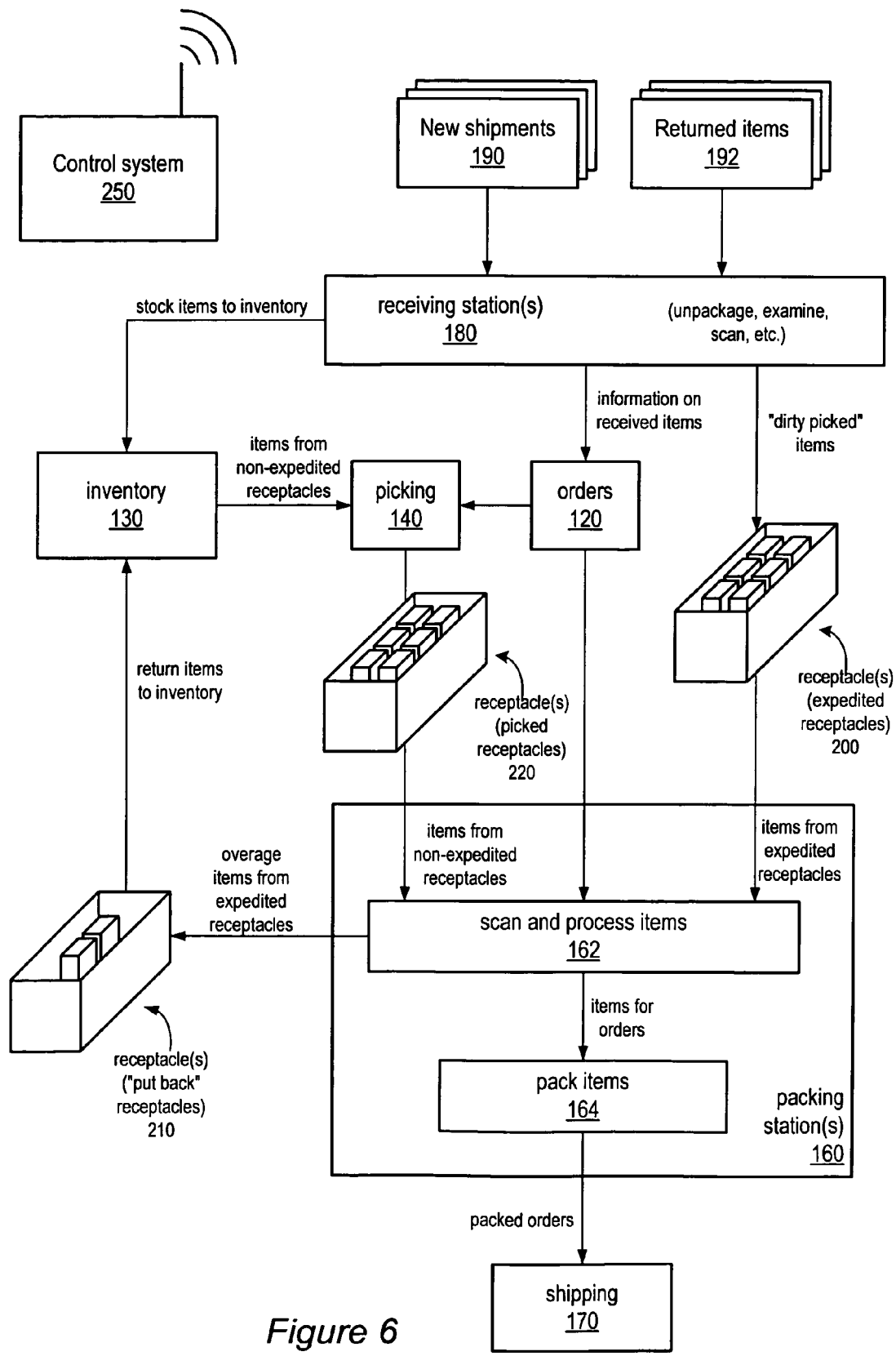
FIG. 6 illustrates in further detail a dirty picking mechanism whereby receptacles containing received items are picked and processed at a downstream packing station in a materials handling facility, according to one embodiment.

FIG. 6 illustrates in further detail a dirty picking mechanism whereby receptacles containing received items are picked and processed at a downstream packing station in a materials handling facility, according to one embodiment. The "dirty picked" receptacles may, for example, be containers including multiple, and possibly heterogeneous, items received in new shipments 190, for example shipments containing newly arriving merchandise from a vendor or from another materials handling facility, to be "cross-docked" to packing 160, receptacles containing collections of returned items, or both.

In one embodiment, returned items 192, for example items returned from customers, received in receiving 180 may be included in receptacles that are "dirty picked". In one embodiment, some or all received items that are returns from customers may be placed into "expedited" receptacle(s) 200 for later picking. Note that the returned items 192 may be processed in receiving 180. This processing may include, but is not limited to, removing the returned items from shipping packages and scanning or otherwise entering the returned items 192 into a materials handling facility control system 250. The processing may also include inspecting the returned items 192 to verify that the items are in a condition to be reshipped to customers. Any damaged items, items with damaged or removed packaging, items missing content, etc. may be set aside for other processing.

Once all of the returned items 192 for a cycle have been processed in receiving 180, the expedited receptacles 200 may be moved to a downstream station in the materials handling facility (e.g., a packing 160 station), where each item in the expedited receptacle 200 may be scanned (or otherwise entered) into the control system 250 and processed 162. Note that, in some materials handling facilities, the same physical location or "station" may be used to receive items as is used to pack and/or ship items. In this case, the expedited receptacle 200 may not have to be moved or conveyed from one station to another station. The items may be scanned as if there is an order 120 for every item that has been returned. In one embodiment, to process the returned items, the materials handling facility control system 250 may be configured to match the returned items 192 to orders 120 in the control system 250. This "expedites" the returned items by preferentially filling orders from the returned items 192 instead of from inventory 130, if possible. Agents may be directed by the control system 250 to pick 140 from inventory 130 any items on the orders 120 that cannot be filled from the expedited returned items 192. The picked items may then be delivered to a downstream station in one or more picked receptacles 220, for example to packing 160 station, for processing along with the "expedited" returned items 192. Note that, in one embodiment, picking of at least some of the items from inventory 130 in this case may be performed in accordance with a "dirty picking" mechanism as described for FIGS. 3 and 4.

When there is not an order 120 in the system 250 that includes a particular item in the expedited receptacle 200, the item is indicated by the control system 250 as "overage" and set aside to be returned to inventory 130, for example by placing the item into a "put-back" receptacle 210, or otherwise disposed. Items for which there is an order may be matched to an order 120 by the control system 250, further processed (e.g., packaging and labeling 164), and delivered to shipping 170 to be shipped to customers 110.

The above describes the "dirty picking" process for returned items 192 as occurring in a cycle. A cycle may be periodic or aperiodic, and may occur once a day, more than once a day, or less than once per day, for example every other day or once a week. For example, all returns may be received in the morning, processing of the "expedited" returns for the day to match the returned items 192 to orders 120 may be performed at midday, and then any remaining items on the orders 120 may be picked from inventory 130. The returned items 120 and picked items may be delivered to a downstream station for processing as if all the items had been ordered, as described above. As another example, returned items 192 may be collected in receiving 180 during the week, and processed as "expedited" receptacles 200 including returned items for orders on Friday. As yet another example, returned items 192 may be collected in receiving 180 until one or more expedited receptacles 200 are full, and then the full expedited receptacles 200 may be processed. As still yet another example, there may be more than one cycle of the "dirty picking" process performed periodically or aperiodically in a day.

In one embodiment, the dirty picking mechanism may be applied to at least some new shipments 190. In this embodiment, a received receptacle including multiple, and possibly heterogeneous, items may be received and initially processed in receiving 180. In processing, the contents of the receptacle are entered into the materials handling facility control system 250. The receptacle may then be "cross-docked" to a downstream station in the materials handling facility (e.g., a packing 160 station), where each item in the receptacle may be scanned or otherwise checked with the control system 250, as if there is an order 120 for every item in the receptacle, and processed by the control system to match the item to an order, if possible. When there is not an order 120 in the system 250 that includes a particular item in the receptacle, the item is treated as "overage" and set aside, for example by placing it into a "put-back" receptacle 210, to be returned to inventory 130 or otherwise disposed. Items for which there is an order may be matched to a particular order 120, further processed (e.g., packaging and labeling 164), and delivered to shipping 170 to be shipped to customers 110. Note that agents may be directed by the control system to pick from inventory 130 any items on the orders 120 that cannot be filled from the "cross-docked" receptacle. The picked items may then be delivered to a downstream station in a picked receptacle 220, for example a packing 160 station, for processing along with the items from the receptacle. Note that, in one embodiment, picking of at least some of the items from inventory 130 in this case may be performed in accordance with a "dirty picking" mechanism as described for FIGS. 3 and 4. Further, in one embodiment, the "cross-docking" dirty picking process for new shipments 190 may be used in conjunction with the "dirty picking" of returned items 192 as described above.

Figure 7:
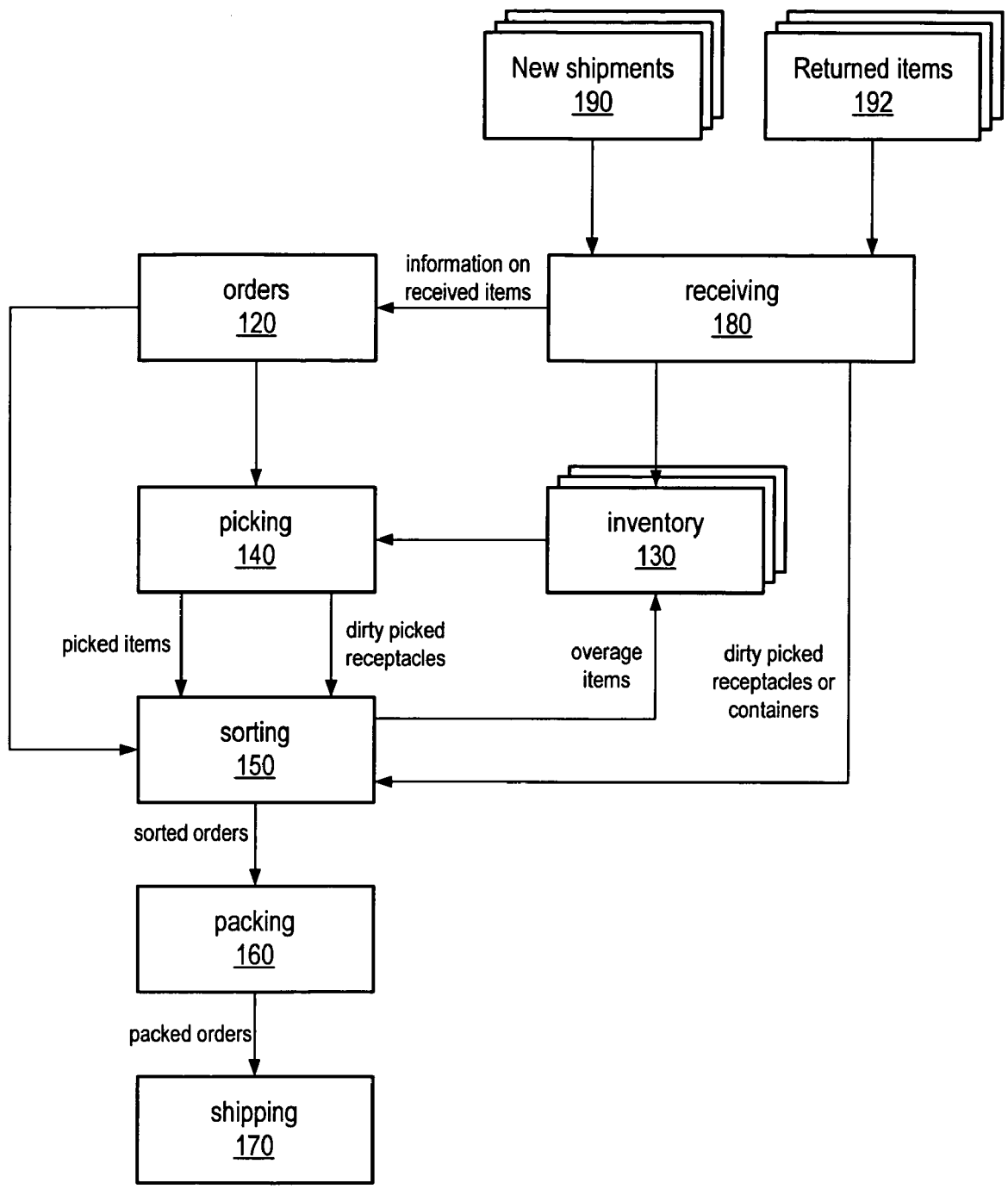
FIG. 7 illustrates a dirty picking mechanism whereby receptacles containing items are picked and processed at a downstream sorting station in a materials handling facility, according to one embodiment.

FIG. 7 illustrates a dirty picking mechanism whereby receptacles containing multiple items are picked and processed at a downstream sorting station in a materials handling facility, according to one embodiment. In some materials handling facilities, at least some picked items may be delivered to a sorting queue for a sorting station 150 where the items may be sorted into their respective orders. Other picked items, such as items for priority orders, may bypass the sorting queue and may be delivered directly to a sorting station 150. Note that sorted orders may be conveyed directly from a sorting station 150 to a packing station 160, or alternatively to another sorting station 150 for additional sorting. In some implementations, sorted orders may be conveyed to some other processing station or processing station queue for additional processing before being conveyed to a packing station 160.

Conventionally, sorting may be performed using automated sorting mechanisms or manual sorting systems. Sorting 150 stations in a materials handling facility may include one or more automated sorting mechanisms, one or more manual sorting stations, or a combination of one or more automated sorting mechanisms and one or more manual sorting stations. Automated sorting mechanisms for sorting certain types of inventory items according to individual orders include, but are not limited to, the Crisplant® sorter, Eurosort® sorters, and automated sorting mechanisms offered by other vendors. Using an automated sorting mechanism, batches or a stream of incoming picked items for multiple different customer orders are received at the automated sorting mechanism and sorted by the automated mechanism according to individual orders.

In some embodiments of the dirty picking mechanism for "dirty picked" receptacles from inventory 130, dirty picked expedited receptacles of returned items 192, for example items returned from customers, from receiving 180, and/or dirty picked receptacles (e.g., containers) including multiple, and possibly heterogeneous, items from shipments 190, for example shipments containing newly arriving merchandise from a vendor or from another materials handling facility, in receiving, instead of delivering a dirty-picked receptacle directly to a packing station 160, the dirty picked receptacle may be delivered to a manual or automated sorting 150 station upstream from the packing 160 station(s). At the sorting 150 station, the "overage" items in the container or receptacle may be separated from the items for orders 120 and set aside as "overage" to be restocked in inventory 130 or otherwise disposed.

If the sorting 150 station is a manual sorting station, the items of a dirty picked receptacle may be scanned and processed in a similar method as was described for the processing at a packing 160 station, except that instead of preparing the items for which there are orders 120 to be shipped, the items may be conveyed to another downstream station (e.g., a packing 160 station) for further processing. If the sorting 150 station is an automated sorting mechanism such as a Crisplant® sorter, the items of a dirty picked receptacle may be inducted into the automated sorting mechanism, which separates the items for which there are orders 120 into slots or bins (there may be more than one order per slot or bin), from which the items may be removed and delivered to a downstream station, for example a packing 160 station. Any "overage" items may be output into one or more "overage" slots or bins, from which the items may be removed for disposal, e.g. for restocking into inventory 130. The automated sorting mechanism typically operates under the control of the materials handling facility control system.

Figure 8:
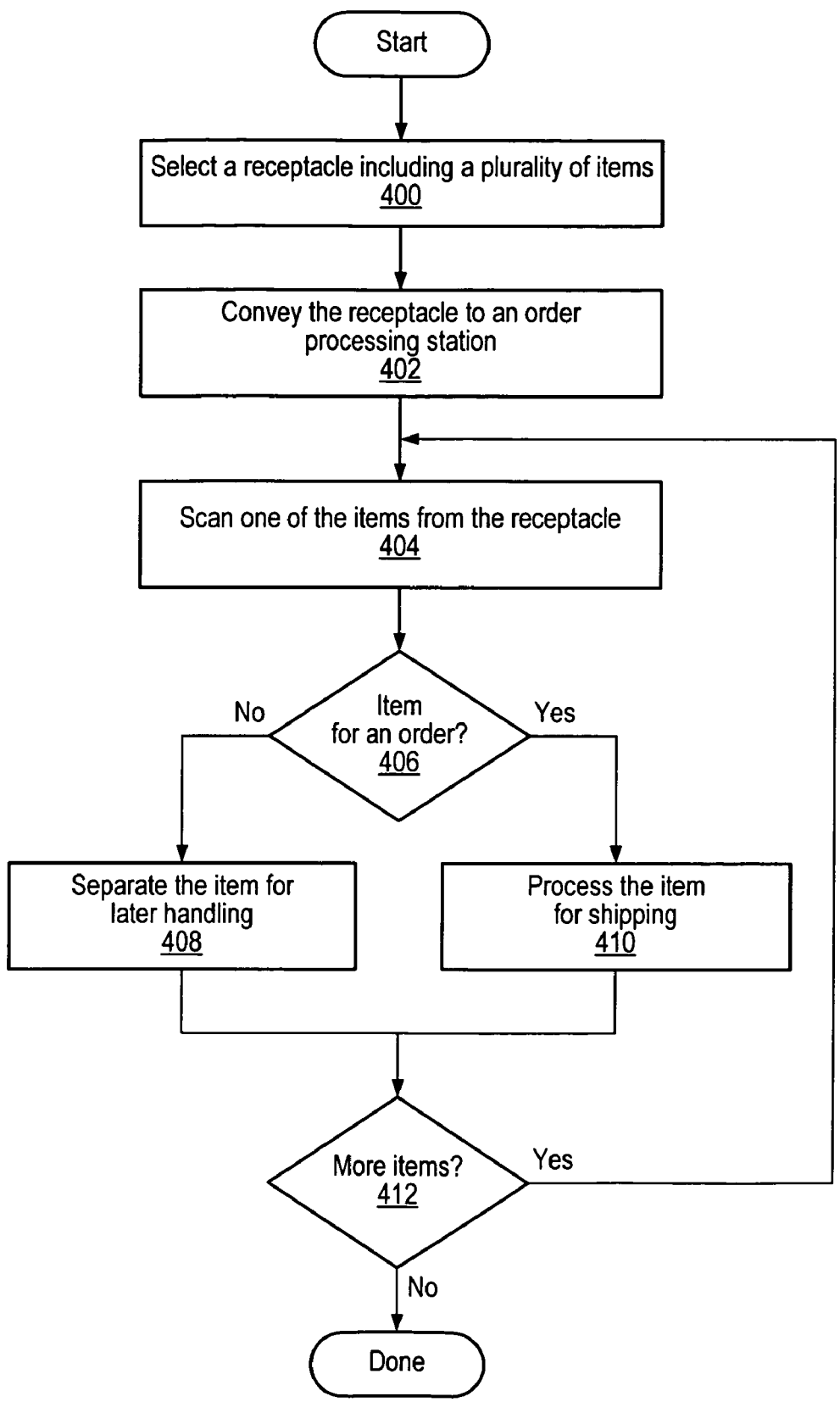
FIG. 8 is a flowchart of a general dirty picking method for a materials handling facility according to one embodiment.

FIG. 8 is a flowchart of a general dirty picking method for a materials handling facility according to one embodiment. While this Figure describes a dirty picking mechanism in the context of processing items for orders, note that "dirty picking" and embodiments of the dirty picking method may be applied to the processing of items in receptacles in a materials handling facility for other reasons than fulfilling orders. For example, embodiments of the dirty picking mechanism may be applied to items that need to be transferred or moved to another facility location or station; to items to be distributed to retail outlet(s); to items that are to be returned to a vendor or vendors; to items that are to be liquidated; to items or parts that are to be assembled at a manufacturing or assembly facility; etc. In general, embodiments of the dirty picking mechanism may be applied to any processing of items located in receptacles in a materials handling facility.

As indicated at 400, a receptacle including multiple, and possibly heterogeneous, items may be selected or "dirty picked" in the materials handling facility. Note that, when "dirty picked", the items in the receptacle are not processed to determine if any of the items are not for current orders in the materials handling facility. Instead, the entire receptacle is picked, regardless of the order status of the items in the receptacle. It is assumed that at least some, perhaps most, of the items in the receptacle are currently ordered items. Note that the selected, receptacle may be an "expedited" receptacle containing returned items from customers in receiving, a container from a new shipment in receiving that contains multiple, and possibly heterogeneous, items, or a receptacle from inventory in a materials handling facility that implements a "random stow" or similar stock stowage technique.

As indicated at 402, the selected receptacle may be conveyed to a "downstream" order processing station, for example a packing station, a sorting station, or some other station. The receptacle may be conveyed to the station by any of a number of methods, including, but not limited to, manual conveyance on a cart of some sort or conveyance via a conveyor belt system of some sort.

At the station, the individual items in the selected receptacle may be processed. As indicated at 404, one of the items from the receptacle may be selected and scanned or otherwise entered into the materials handling facility control system. The materials handling facility control system may then indicate that the item is for a current order being processed, or that the item is not for a current order, and thus is an "overage" item, as indicated at 406. If the item is not for a current order, the item may be separated for later handling, as indicated at 408. For example, the item may be placed in a "put-back" receptacle containing "overage" items to later be returned to inventory. If the item is for a current order, then the item may be further processed for shipping to a customer, as indicated at 410.

As indicated at 412, if there are more items in the receptacle to be processed, a next item may be selected and processed at 404, and processing of the next item may continue from there, as described above. If there are no more items in the receptacle to be processed, then processing of the items in the dirty picked receptacle is complete. In one embodiment, the emptied receptacle may be "recycled" to be used again in inventory or for some other use.

Figure 9:
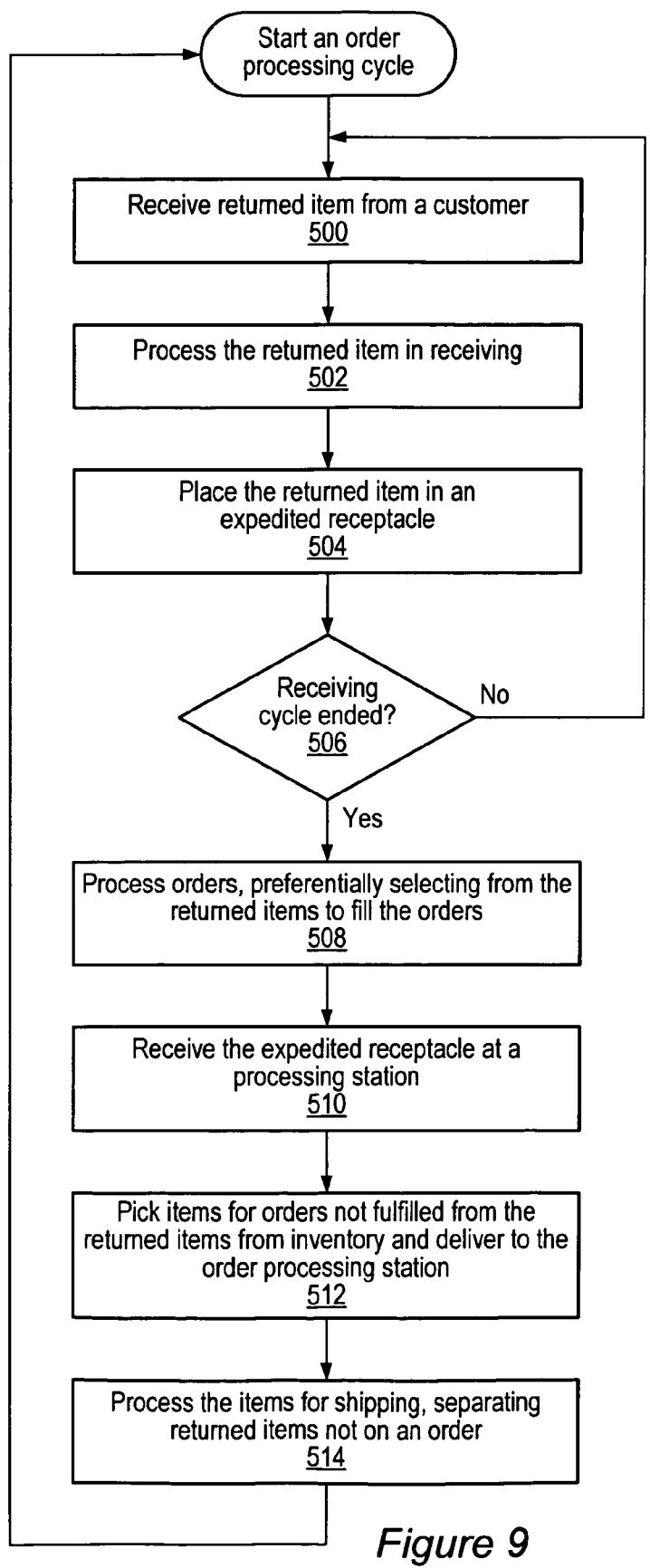
FIG. 9 is a flowchart of a method for the "dirty picking" of returned items according to one embodiment.

FIG. 9 is a flowchart of a method for "dirty picking" a receptacle containing returned items according to one embodiment. In embodiments, "dirty picking" of a receptacle containing returned items may be performed in an order processing cycle, which may be a periodic or aperiodic cycle, and which may be performed once a day, two or more times per day, or less than once per day.

In an order processing cycle, receiving may receive returned items from customers during a "receiving cycle". During the receiving cycle, returned items from customers may be received, as indicated at 500. Each returned item may be processed in receiving, as indicated at 502. This processing may include, but is not limited to, removing the returned items from shipping packages and scanning or otherwise entering the returned items into a materials handling facility control system. The processing may also include inspecting the returned items to verify that the items are in a condition to be reshipped to customers. Any damaged items, items with damaged or removed packaging, items missing content, etc. may be set aside for other processing. The processed returned items may be place into an "expedited" receptacle, as indicated at 504.

At 506, if the receiving cycle has not ended, then additional returned items may be received and processed, as described above. If the receiving cycle has ended, then the control system may initiate a processing of orders from customers, wherein returned items in the expedited receptacle are preferentially selected or "expedited" to fill the orders, as indicated at 508.

The expedited receptacle may be received at a processing station, for example a packing station or sorting station, as indicated at 510. The control system may direct agents of the materials handling facility to pick items from inventory for orders not fulfilled from the returned items, and to deliver the picked items to the order processing station, as indicated at 512. As indicated at 514, the items in the expedited receptacle and the items picked from inventory may then be processed at the station, with the returned items in the expedited receptacle separated from the picked and returned items for orders using a method similar to the one described for FIG. 8. The next order processing cycle may then begin. (Note that additional returned items may be received and processed in receiving at any time during the order processing cycle after an expedited receptacle has been conveyed to the order processing station.

Materials Handling Facility Control System

Figure 10:
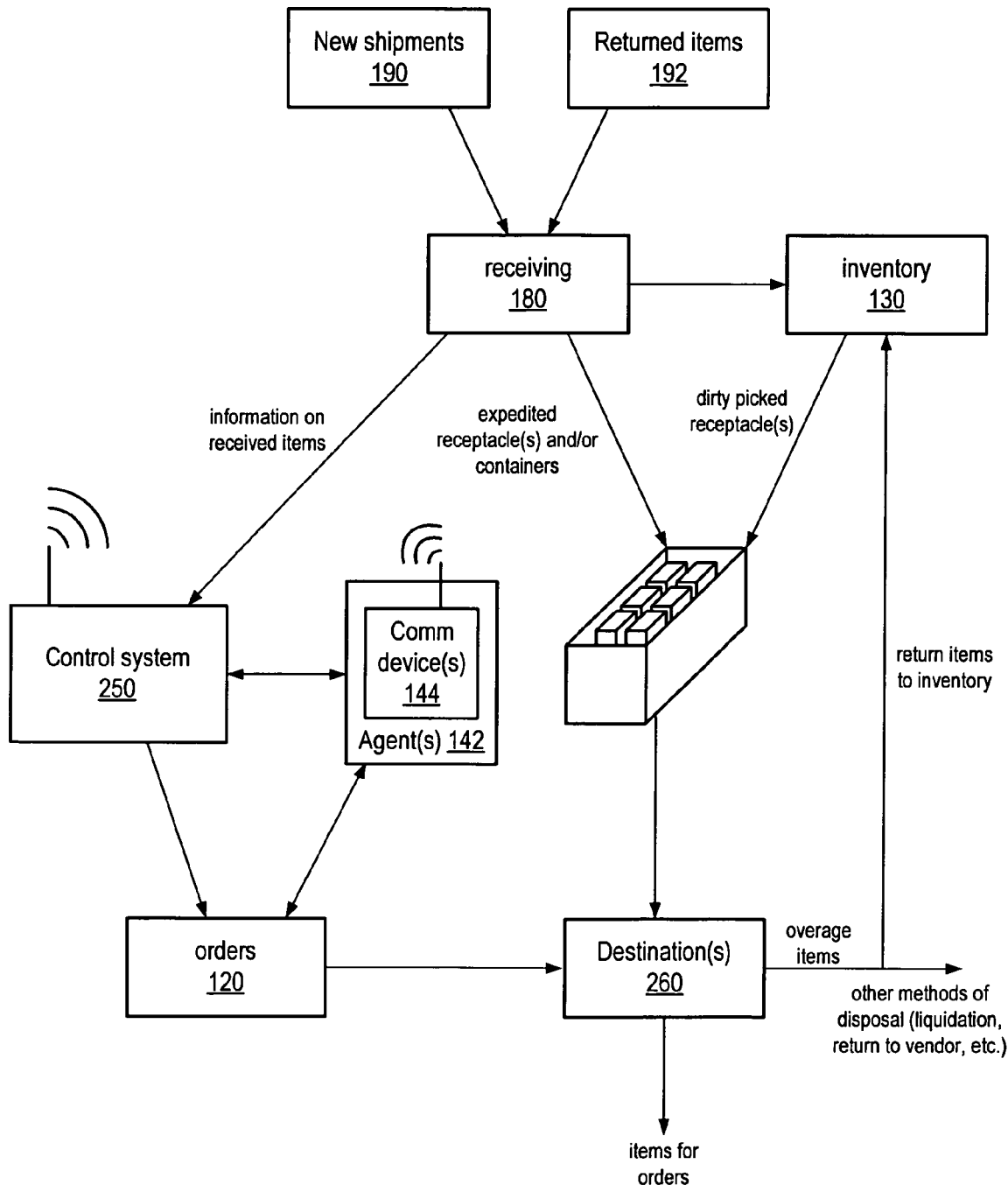
FIG. 10 illustrates a materials handling facility implementing a "dirty picking" mechanism for items in inventory and items received in receiving, and including a control system configured to control the "dirty picking" process according to one embodiment.

FIG. 10 illustrates a materials handling facility implementing a "dirty picking" mechanism for items in inventory and items received in receiving, and including a control system configured to control the "dirty picking" process according to one embodiment. A materials handling facility such as order fulfillment center 90 of FIG. 2 may implement a materials handling facility control system, or control system for short. A control system, such as control system 250 of FIG. 10, may include hardware and/or software configured for assisting and/or directing agents in the order fulfillment center 90 in fulfilling customers' orders and for controlling a "dirty picking" process as described herein. Items in the materials handling facility may be marked or tagged with a bar code, Universal Product Code (UPC), Stock-Keeping Unit (SKU) code, serial number, and/or other designation (including proprietary designations) to facilitate materials handling facility operations, including, but not limited to, picking, dirty picking, sorting and packing. These designations, or codes, may identify items by type, and/or may identify individual items within a type of item. The control system 250 may include hand-held, mobile and/or fixed scanners or scanning devices that may be able to scan, receive, or otherwise detect the marks or tags on individual items and communicate with a control station or stations of the control system 250 to determine and record the item and/or item type of the items and, for example, to associate items from dirty picked receptacles with orders and to separate "overage" items from items in orders.

The control system 250 may be configured to receive order information for each order specifying the item or items to be picked to fulfill the order. Each order may be assigned a unique order number for use in the order fulfillment process. Item and/or item type information, including associated item and/or item type designations or codes and possibly other descriptive information, may be entered into the control system 250 by an agent 142 for each item picked from inventory 130 and/or for returned or new items received in receiving 180. This information may be scanned into the control system 250 from marks or tags on the items or, alternatively, may be manually entered. A combination of scanning and manual entry may be employed. In one embodiment, receptacles within the materials handling facility and/or packages and containers received in shipping may include designations or codes that may similarly be entered in the control system 250. Information scanned or entered for a receptacle or container may inform the control system 250 of the contents of that receptacle or container.

The control system 250 may be configured to direct agents 142 to "dirty pick" receptacles 250 from inventory 130. The control system 250 may further be configured to "expedite" receptacles of returned items 192, for example items returned from customers, and/or containers including multiple, and possibly heterogeneous, items in new shipments 190, for example shipments containing newly arriving merchandise from a vendor or from another materials handling facility, received in receiving to fill current orders, and to direct agents 142 to pick any items not filled from the expedited items.

The "dirty picked" receptacles and containers may be delivered to one or more downstream destinations 260, such as a packing station or sorting station. At the destination 260, the control system 250 may control the separation of items in dirty picked receptacles into items for orders and overage items. The control system may also direct agent(s) as to the disposition of overage items, for example by indicating that the overage items are to be restocked into inventory 130.

Figure 11:
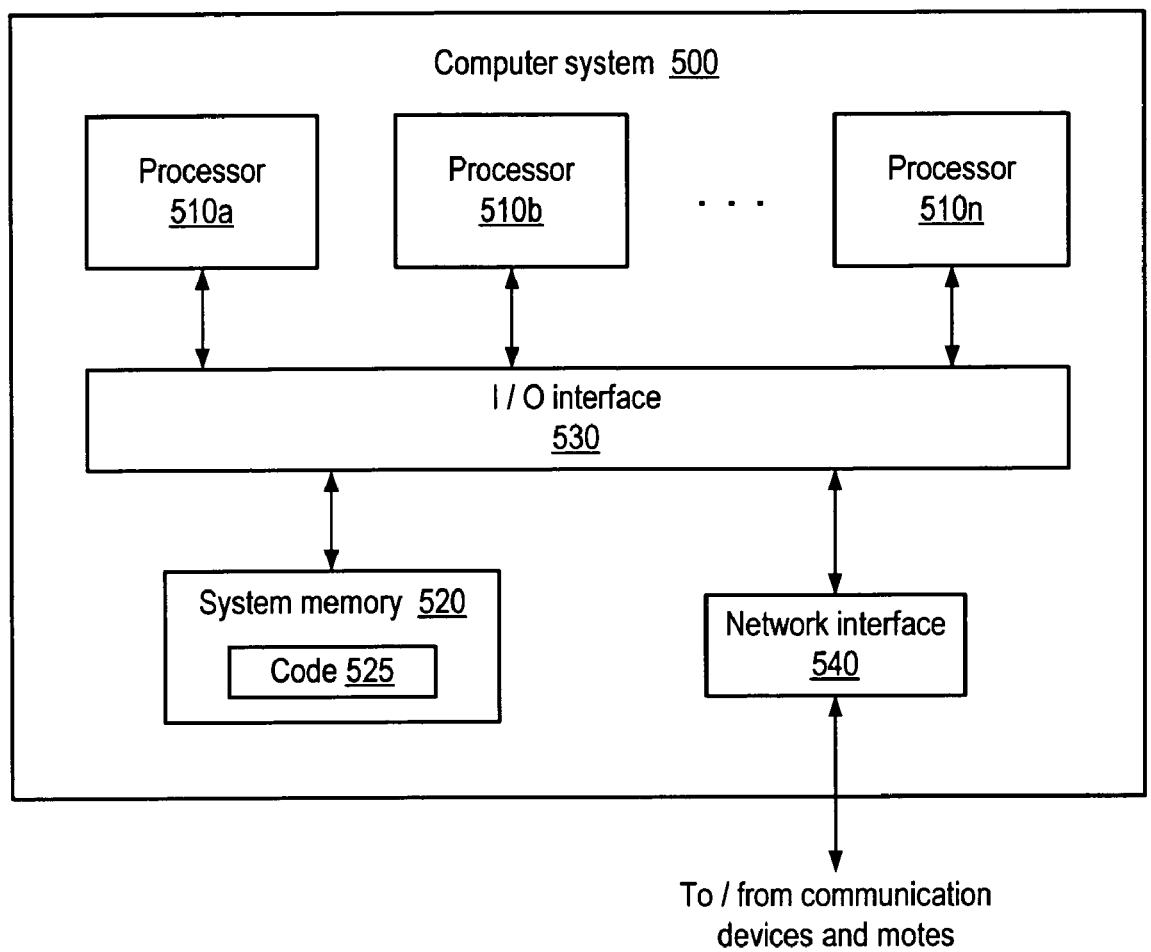
FIG. 11 is a block diagram illustrating an exemplary embodiment of a computer system.

In one embodiment, a materials handling facility control system, such as control system 250 illustrated in FIG. 10, may include a general-purpose computer system that includes or is configured to access one or more computer-accessible media, such as computer system 500 illustrated in FIG. 11. In the illustrated embodiment, computer system 500 includes one or more processors 510 coupled to a system memory 520 via an input/output (I/O) interface 530. Computer system 500 further includes a network interface 540 coupled to I/O interface 530. In some embodiments, computer system 500 may be illustrative of control system 250, while in other embodiments control system 250 may include elements in addition to computer system 500.

In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by process 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a materials handling facility control system, are shown stored within system memory 520 as code 525.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices on a network, such as other computer systems, for example. In particular, network interface 540 may be configured to allow communication between computer system 500 and the various communication devices 144 described above. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet network, for example. Additionally, network interface 540 may support communication via telecommunications/telephony networks such as analog voice networks or digital fiber communications networks, via storage area networks such as Fibre Channel SANs, or via any other suitable type of network and/or protocol.

In some embodiments, system memory 520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 500 via I/O interface 530. A computer-accessible medium may also include any volatile or non-volatile media such as RAM (e.g. SDRAM, DDR SDRAM, RDRAM, SRAM, etc.), ROM, etc, that may be included in some embodiments of computer system 500 as system memory 520 or another type of memory. Further, a computer-accessible medium may include transmission media or signals such as electrical, electromagnetic, or digital signals, conveyed via a communication medium such as a network and/or a wireless link, such as may be implemented via network interface 540.

In one embodiment, the relationship between a control system 250 and communication devices 144 may be a server/client type of relationship. For example, control system 250 may be configured as a server computer system 500 that may convey instructions to and receive acknowledgements from communication devices 144. In such an embodiment, communication devices 144 may be relatively simple or "thin" client devices. For example, communication devices 144 may be configured as dumb terminals with display, data entry and communications capabilities, but otherwise little computational functionality. However, it is contemplated that in some embodiments, communication devices 144 may be computer systems configured similarly to computer system 500, including one or more processors 510 and various other devices (though in some embodiments, a computer system 500 implementing a communication device 144 may have somewhat different devices, or different classes of devices, compared to a computer system 500 implementing control system 250). It is further contemplated that in some embodiments, the functionality of control system 250 may be distributed across some or all of communication devices 144. That is, in some embodiments, there may be no centralized point of control of the activity of order fulfillment center agents; rather, communication devices 144 and other devices may function in a cooperative, distributed fashion to coordinate the activities of the order fulfillment center.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    selecting a receptacle containing a plurality of items for processing at a station of a materials handling facility in response to receiving an order for one or more of the plurality of items, wherein the plurality of items includes two or more heterogeneous items, wherein the location of the one or more of the plurality of items within the receptacle is not known at said selecting, and wherein the receptacle is selected without processing the individual items in the receptacle;
    receiving the receptacle containing the plurality of items at the station, wherein the station is configured to process items specified by orders, and wherein a portion of the plurality of items in the receptacle are for one or more current orders; and
    at the direction of a control system of the materials handling facility, separating the items from the receptacle specified by the one or more current orders from one or more items from the receptacle that are overage items not specified by the one or more current orders.

2. The method as recited in claim 1, wherein the one or more current orders are one or more customer orders for items to be shipped to one or more customers, the method further comprising processing the items from the receptacle for the one or more current orders for shipping to the one or more customers.

3. The method as recited in claim 1, wherein the one or more current orders are one or more orders for items to be shipped to one or more retail outlets, the method further comprising processing the items from the receptacle for the one or more current orders for shipping to the one or more retail outlets.

4. The method as recited in claim 1, wherein the one or more current orders are one or more orders for items to be assembled, the method further comprising processing the items from the receptacle for assembly.

5. The method as recited in claim 1, wherein the one or more current orders are one or more orders for items to be returned to one or more vendors, the method further comprising processing the items from the receptacle for return to the one or more vendors.

6. The method as recited in claim 1, wherein the one or more current orders are one or more orders for items to be liquidated from the materials handling facility, the method further comprising processing the items from the receptacle for liquidation.

7. The method as recited in claim 1, wherein the one or more current orders comprise a plurality of orders, the method further comprising placing the one or more items from the receptacle that are not for the current orders in a put-back receptacle to be put back into inventory in the materials handling facility.

8. The method as recited in claim 1, wherein the materials handling facility comprises an inventory for storing a plurality of heterogeneous items, wherein the plurality of heterogeneous items are stored in the inventory in accordance with a random-stow technique wherein two or more heterogeneous items are stored together in a receptacle in the inventory, the method further comprising:
    picking a receptacle from the inventory;
    wherein the receptacle containing a plurality of items received at the station is the receptacle picked from the inventory.

9. The method as recited in claim 8, further comprising consolidating the one or more items from the receptacle that are not for the one or more current order sinto other receptacles in the inventory of the materials handling facility.

10. The method as recited in claim 8, wherein at least one of the items from the receptacle that are not for the one or more current orders is not returned to the inventory of the materials handling facility.

11. The method as recited in claim 1, wherein the materials handling facility comprises a receiving station for receiving items and processing the received items into the materials handling facility, wherein the received items include returned items from customers of the materials handling facility, the method further comprising:
    placing a plurality of the returned items into an expedited receptacle;
    wherein the receptacle received at the station is the expedited receptacle.

12. The method as recited in claim 1, wherein the materials handling facility comprises a receiving station for receiving shipments of items and processing the shipments into the materials handling facility, wherein at least one of the shipments includes a container containing a plurality of heterogeneous items, wherein the receptacle received at the station is the container.

13. The method as recited in claim 1, wherein the materials handling facility comprises an inventory for storing a plurality of heterogeneous items for picking by agents of the materials handling facility to fulfill orders under the direction of the control system, and wherein the method further comprises:
    fulfilling at least some of the orders from the plurality of items in the received receptacle; and
    if one or more items specified by the orders are not fulfilled from the plurality of items in the received receptacle, directing one or more of the agents to pick the unfulfilled items from the inventory for processing at the station.

14. The method as recited in claim 1, wherein the station configured to receive a receptacle containing a plurality of items is a packing station.

15. The method as recited in claim 1, wherein the station configured to receive a receptacle containing a plurality of items is a sorting station.

16. The method as recited in claim 15, wherein the sorting station comprises an automated sorting mechanism, the method further comprising inducting the plurality of items from the receptacle into the automated sorting mechanism.

17. A materials handling facility, comprising:
    one or more stations for processing items for orders;
    a control system configured to control fulfillment of orders within the materials handling facility, wherein the control system is configured to match items in a receptacle to orders without having instructed that one or more of the items in the receptacle be individually processed prior to the receptacle being processed at one of the stations, wherein the items in the receptacle comprise two or more heterogeneous items;

wherein at least one of the stations is configured to:
receive a receptacle containing a plurality of items, wherein a portion but not all of the plurality of items are for current orders, and wherein the location of one or more of the items in the receptacle is not known at the at least one of the stations when the receptacle is received; and
at the direction of the control system, separate the items from the receptacle for the current orders from one or more items from the receptacle that are not for the current orders.

18. The materials handling facility as recited in claim 17, further comprising:
an inventory for storing a plurality of heterogeneous items, wherein the plurality of heterogeneous items are stored in the inventory in accordance with a random-stow technique wherein two or more heterogeneous items are stored together in a receptacle in the inventory;
wherein the receptacles in inventory are configured to be selected for processing at one of the one or more stations for processing the items for orders under the direction of the control system; and
wherein the receptacle containing a plurality of items received at a station is a receptacle picked from the inventory.

19. The materials handling facility as recited in claim 17, further comprising:
a receiving station for receiving items and processing the received items into the materials handling facility, wherein the received items include heterogeneous returned items from customers, wherein the receiving station is configured to:
place a plurality of the returned items in a receptacle;
wherein the receptacle received at the station is the receptacle containing the plurality of the returned items.

20. The materials handling facility as recited in claim 17, further comprising:
a receiving station for receiving shipments of items and processing the shipments into the materials handling facility, wherein at least one of the shipments includes a container containing a plurality of heterogeneous items; and
wherein the receptacle containing a plurality of items received at the station is the container.

21. The materials handling facility as recited in claim 17, further comprising:
an inventory for storing a plurality of heterogeneous items;
wherein the control system is configured to:
fulfill orders from the plurality of items in the received receptacle; and
if one or more items specified by the orders are not fulfilled from the plurality of items in the received receptacle, direct one or more agents to pick the unfulfilled items from the inventory for processing at the station.

22. The materials handling facility as recited in claim 17, wherein the station configured to receive a receptacle containing a plurality of items is a packing station.

23. The materials handling facility as recited in claim 17, wherein the station configured to receive a receptacle containing a plurality of items is a sorting station.

24. The materials handling facility as recited in claim 23, wherein the sorting station comprises an automated sorting mechanism, wherein the automated sorting mechanism is configured to receive the plurality of items from the receptacle into an induction mechanism.

25. A materials handling facility, comprising:
one or more stations for processing items for orders;
a control system configured to control fulfillment of orders within the materials handling facility, wherein the control system is configured to direct the selection of a receptacle containing a plurality of items for processing at one of the stations in response to receiving an order for one or more of the plurality of items without having determined that all of the items in the receptacle are for current orders in the control system, wherein the plurality of items includes two or more heterogeneous items, and wherein the location of one or more of the plurality of items within the receptacle is not known at selection of the receptacle;
wherein at least one of the stations is configured to:
enter information on each of the items in the receptacle containing the plurality of items into the control system; and
at the direction of the control system, separate the items from the receptacle for the current orders from one or more items from the receptacle that are not for the current orders.

26. The materials handling facility as recited in claim 25, further comprising:
an inventory for storing a plurality of heterogeneous items, wherein the plurality of heterogeneous items are stored in the inventory in accordance with a random-stow technique wherein two or more heterogeneous items are stored together in a receptacle in the inventory;
wherein the receptacles in inventory are configured to be selected for processing at one of the one or more stations for processing the items for orders under the direction of the control system; and
wherein the receptacle containing a plurality of heterogeneous items received at a station is a receptacle picked from the inventory for processing at the station.

27. The materials handling facility as recited in claim 25, further comprising:
a receiving station for receiving items and processing the received items into the materials handling facility, wherein the received items include heterogeneous returned items from customers, wherein the receiving station is configured to:
enter information on each of the returned items into the control system; and
place a plurality of the returned items in a receptacle for processing at one of the one or more stations for processing of the returned items for orders under the direction of the control system;
wherein the receptacle containing a plurality of items received at the station is the receptacle containing the plurality of the returned items.

28. The materials handling facility as recited in claim 25, further comprising:
a receiving station for receiving shipments of items and processing the shipments into the materials handling facility, wherein at least one of the shipments includes one or more containers containing a plurality of heterogeneous items; and
wherein the receptacle containing a plurality of items received at the station is one of the one or more containers containing a plurality of heterogeneous items.

29. The materials handling facility as recited in claim 25, further comprising:

an inventory for storing a plurality of heterogeneous items for picking to fulfill orders under the direction of the control system;

wherein the control system is configured to:
fulfill orders from the plurality of items in the received receptacle; and
if one or more items specified by the orders are not fulfilled from the plurality of items in the received receptacle, direct one or more of the agents to pick the unfulfilled items from the inventory for processing at the station.

30. The materials handling facility as recited in claim 25, wherein the station configured to receive a receptacle containing a plurality of items is a packing station.

31. The materials handling facility as recited in claim 25, wherein the station configured to receive a receptacle containing a plurality of items is a sorting station.

32. The materials handling facility as recited in claim 31, wherein the sorting station comprises an automated sorting mechanism, wherein the automated sorting mechanism is configured to receive the plurality of items from the receptacle into an induction mechanism.

33. A computer-accessible medium comprising program instructions, wherein the program instructions are configured to implement a materials handling facility control system configured to:
direct the selection of a receptacle containing a plurality of items in a materials handling facility for processing at a station of the materials handling facility in response to receiving an order for one or more of the plurality of items, wherein the plurality of items includes two or more heterogeneous items, wherein the location of the one or more of the plurality of items within the receptacle is not known at the selection of the receptacle, wherein the station is configured to process items for orders, wherein a portion of the plurality of items are for current orders in the control system, and wherein the receptacle is selected without processing the individual items in the receptacle to distinguish items for current orders from items not for current orders;
direct the processing of the selected receptacle at the station, wherein, to direct the processing of the selected receptacle, the materials handling facility control system is configured to:
direct the separation of the items from the receptacle for the current orders from one or more items from the receptacle that are not for the current orders.

34. The computer-accessible medium as recited in claim 33, wherein the current orders are customer orders for items to be shipped to one or more customers and wherein the control system is further configured to direct the processing of the items from the receptacle for the current orders for shipping to the one or more customers.

35. The computer-accessible medium as recited in claim 33, wherein the current orders are orders for items to be shipped to one or more retail outlets, wherein the control system is further configured to direct the processing of the items from the receptacle for the current orders for shipping to the one or more retail outlets.

36. The computer-accessible medium as recited in claim 33, wherein the current orders are orders for items to be assembled, wherein the control system is further configured to direct the processing of the items from the receptacle for assembly.

37. The computer-accessible medium as recited in claim 33, wherein the current orders are orders for items to be returned to one or more vendors, wherein the control system is further configured to direct the processing of the items from the receptacle for return to the one or more vendors.

38. The computer-accessible medium as recited in claim 33, wherein the current orders are orders for items to be liquidated from the materials handling facility, wherein the control system is further configured to direct the processing of the items from the receptacle for liquidation.

39. The computer-accessible medium as recited in claim 33, wherein the control system is further configured to direct the storage of the one or more items from the receptacle that are not for the current orders into inventory in the materials handling facility.

40. The computer-accessible medium as recited in claim 33, wherein the materials handling facility comprises an inventory for storing a plurality of heterogeneous items for picking by agents of the materials handling facility to fulfill the orders under the direction of the control system, wherein the plurality of heterogeneous items are stored in the inventory in accordance with a random-stow technique wherein two or more heterogeneous items are stored together in a receptacle in the inventory, and wherein, to direct the selection of a receptacle, the control system is further configured to direct one of the agents to pick one of the receptacles from the inventory, wherein the selected receptacle containing a plurality of items is the receptacle picked from the inventory by the agent.

41. The computer-accessible medium as recited in claim 40, wherein the control system is further configured to direct the consolidation of the one or more items from the receptacle that are not for the current orders into other receptacles in the inventory of the materials handling facility.

42. The computer-accessible medium as recited in claim 40, wherein the control system is further configured to indicate that at least one of the items from the receptacle that are not for the current orders is not to be returned to the inventory of the materials handling facility.

43. The computer-accessible medium as recited in claim 33, wherein the materials handling facility comprises a receiving station for receiving items and processing the received items into the materials handling facility, wherein the received items include heterogeneous returned items from customers of the materials handling facility;
wherein, to direct the selection of a receptacle, the control system is further configured to:
direct the placement of a plurality of the returned items into an expedited receptacle;
wherein the selected receptacle containing a plurality of items processed at the station is the expedited receptacle.

44. The computer-accessible medium as recited in claim 33, wherein the materials handling facility comprises a receiving station for receiving shipments of items and processing the shipments into the materials handling facility, wherein at least one of the shipments includes one or more containers containing a plurality of heterogeneous items;
wherein the selected receptacle containing a plurality of items processed at the station is the container.

45. The computer-accessible medium as recited in claim 33, wherein the materials handling facility comprises an inventory for storing a plurality of heterogeneous items for picking by agents of the materials handling facility to fulfill the orders under the direction of the control system, and wherein the control system is further configured to:
fulfill orders from the plurality of items in the selected receptacle; and
if one or more items specified by the orders are not fulfilled from the plurality of items in the selected receptacle, direct selection of the unfulfilled items from the inventory for processing at the station.

46. The computer-accessible medium as recited in claim 33, wherein the station configured to receive a receptacle containing a plurality of items is a packing station.

47. The computer-accessible medium as recited in claim 33, wherein the station configured to receive a receptacle containing a plurality of items is a sorting station.

48. The computer-accessible medium as recited in claim 47, wherein the sorting station comprises an automated sorting mechanism configured to receive and sort the plurality of items in the selected receptacle under the direction of the control system.

* * * * *

UNITED STATES PATENT AND TRADEMARK OFFICE
CERTIFICATE OF CORRECTION

PATENT NO. : 7,974,891 B2  
APPLICATION NO. : 11/389872  
DATED : July 5, 2011  
INVENTOR(S) : Jonathan J. Shakes, Eric Young and Donald L. Kaufman It is certified that error appears in the above-identified patent and that said Letters Patent is hereby corrected as shown below:

In the Claims:

Claim 9, col. 26, line 17, please delete "order sinto" and insert --orders into-- in place thereof.

Claim 33, col. 29, lines 23 and 24, please delete "programinstructions" and insert --program instructions-- in place thereof.

Signed and Sealed this  
Fourth Day of October, 2011

David J. Kappos  
*Director of the United States Patent and Trademark Office*